(12) United States Patent
Ohsawa et al.

(10) Patent No.: US 7,281,250 B2
(45) Date of Patent: Oct. 9, 2007

(54) MULTI-THREAD EXECUTION METHOD AND PARALLEL PROCESSOR SYSTEM

(75) Inventors: Taku Ohsawa, Tokyo (JP); Satoshi Matsushita, Tokyo (JP)

(73) Assignee: NEC Corporation, Tokyo (JP)

( * ) Notice: Subject to any disclaimer, the term of this patent is extended or adjusted under 35 U.S.C. 154(b) by 702 days.

(21) Appl. No.: 10/133,409

(22) Filed: Apr. 29, 2002

(65) Prior Publication Data

US 2003/0014471 A1 Jan. 16, 2003

(30) Foreign Application Priority Data

Jul. 12, 2001 (JP) .............................. 2001-212246

(51) Int. Cl.
*G06F 9/50* (2006.01)
*G06F 9/48* (2006.01)

(52) U.S. Cl. ....................... 718/102; 712/216; 712/228; 718/108

(58) Field of Classification Search .................... 718/1, 718/100–108; 712/216, 228, 1–300
See application file for complete search history.

(56) References Cited

U.S. PATENT DOCUMENTS

| | | | | |
|---|---|---|---|---|
| 5,724,565 A * | 3/1998 | Dubey et al. ................ | 712/245 |
| 5,742,822 A * | 4/1998 | Motomura .................... | 718/102 |
| 5,867,704 A * | 2/1999 | Tanaka et al. ............... | 718/105 |
| 5,913,059 A | 6/1999 | Torii | |
| 6,286,027 B1 * | 9/2001 | Dwyer et al. ................ | 718/107 |
| 6,330,661 B1 * | 12/2001 | Torii ........................... | 712/228 |
| 6,389,446 B1 * | 5/2002 | Torii ........................... | 718/100 |
| 6,574,725 B1 * | 6/2003 | Kranich et al. ................ | 712/31 |
| 6,687,812 B1 * | 2/2004 | Shimada ...................... | 712/230 |
| 2003/0014473 A1 * | 1/2003 | Ohsawa et al. ............. | 709/107 |
| 2003/0018684 A1 * | 1/2003 | Ohsawa et al. ............. | 709/102 |

FOREIGN PATENT DOCUMENTS

EP 0 330 836 A2 9/1989

(Continued)

OTHER PUBLICATIONS

Torii et al. "Proposal of on chip multiprocessor orientated control parallel architecture MUSCAT," Parallel Processing Symposium JSPP97 articles, Japanese Society of Information Processing Engineers of Japan, pp. 229-236, Abstract attached, May 1997.

(Continued)

*Primary Examiner*—Lewis A. Bullock, Jr.
(74) *Attorney, Agent, or Firm*—Foley & Lardner LLP

(57) ABSTRACT

With a single program divided into a plurality of threads A to C, at the execution of the threads in parallel to each other by a plurality of processors, determination is made of a forkability of a slave thread into other processor in response to a fork instruction in a master thread being executed by a predetermined processor and when forkable, the slave thread is forked into other processor and when not forkable, the fork instruction is invalidated to execute an instruction subsequent to the fork instruction by the predetermined processor and then execute a group of instructions of the slave thread by the predetermined processor.

23 Claims, 22 Drawing Sheets

FOREIGN PATENT DOCUMENTS

| | | |
|---|---|---|
| JP | 08-249183 | 9/1996 |
| JP | 10-27108 | 1/1998 |
| JP | 10-78880 | 3/1998 |
| JP | 2000-020326 | 1/2000 |
| JP | 2000-047887 | 2/2000 |
| WO | WO92/03794 | 3/1992 |
| WO | WO 01/33352 A1 | 5/2001 |

OTHER PUBLICATIONS

Dynamic Allocation of Processes and Threads for Transaction Processing, IBM Technical Disclosure Bulletin, vol. 41(1):499-500, Jan. 1998, © IBM Corp.

Ōsawa, Taku and 7 others: Investigation of the mixed thread execution scheme under MUSCAT. Jōhō Shori Gakkai Kenkyū Hōkoku [Information Processing Society Research Reports], Japan, Information Processing Society, Aug. 4, 1999, vol. 99, No. 67, pp. 169-174.

* cited by examiner

FIG. 10

(a)
```
            addu    r14, r14, 5
            sw      r14, (r16)
            lw      r1, 4(r16)
    _loop:  jal     _func
            sub     r1, r1, 1
            bne     r1, r0, _loop
```

(b)
```
            fork    _th1
            addu    r14, r14, 5
            sw      r14, (r16)
            term
    _th1:   lw      r1, 4(r16)
    _loop:  fork    _th2
            jal     _func
            term
    _th2:   sub     r1, r1, 1
            bne     r1, r0, _loop
```

FIG.13

```
         fork    _th1
         addu    r14,r14,5
         sw      r14,(r16)
_th1:    lw      r1,4(r16)
_loop:   fork    _th2
         jal     _func
_th2:    sub     r1,r1,1
         bne     r1,r0,_loop
```

FIG.21

```
        fork    _th1,r1,r16,sp
        addu    r14,r14,5
        sw      r14,(r16)
_th1:   lw      r1,4(r16)
_loop:  fork    _th2,r1,sp
        jal     _func
_th2:   sub     r1,r1,1
        bne     r1,r0,_loop
```

FIG.22

```
        fork    _th1
        addu    r14,r14,5
        sw      r14,(r16)
_th1:   lw      r1,4(r16)
_loop:  create  r1,sp
        fork    _th2
        jal     _func
_th2:   sub     r1,r1,1
        bne     r1,r0,_loop
```

FIG.23

```
        fork    _th1,
        addu    r14,r14,5
        sw      r14,(r16)
_th1:   lw      r1,4(r16)
_loop:  fork    _th2
        create  r1,sp
        jal     _func
_th2:   sub     r1,r1,1
        bne     r1,r0,_loop
```

MULTI-THREAD EXECUTION METHOD AND PARALLEL PROCESSOR SYSTEM

BACKGROUND OF THE INVENTION

1. Field of the Invention

The present invention relates to a program parallel execution method in a parallel processor system and, more particularly, to a multi-thread execution method of executing a single program which is divided into a plurality of threads in parallel to each other by a plurality of processors and a parallel processor system.

2. Description of the Related Art

Among methods of processing a single program in parallel by a parallel processor system is a multi-thread execution method of executing a program divided into instruction streams called threads in parallel to each other by a plurality of processors. The method is recited, for example, in Japanese Patent Laying-Open (Kokai) No. Heisei 10-27108 (hereinafter referred to as Literature 1), "Proposal of On Chip Multiprocessor Oriented Control Parallel Architecture MUSCAT" (Parallel Processing Symposium JSPP97 Articles, Japanese Society of Information Processing Engineers of Japan, pp. 229-236, May 1997) (hereinafter referred to as Literature 2) and Japanese Patent Laying-Open (Kokai) No. Heisei 10-78880 (hereinafter referred to as Literature 3). In the following, the conventional multi-thread execution methods recited in the literatures will be described.

It is a common practice in a multi-thread execution method to call generating a new thread on other processor as forking a thread and call a thread on the side which conducts forking operation as a master thread, a newly generated thread as a slave thread, a point where a thread is forked as a fork point and a top portion of a slave thread as a fork destination address or a start point of a slave thread. In the Literatures 1 to 3, a fork instruction is inserted at a fork point in order to give an instruction to conduct thread forking. The fork instruction has designation of a fork destination address, so that execution of the fork instruction generates a slave thread starting at the fork destination address on other processor to start execution of the slave thread. In addition, an instruction called a term instruction which terminates processing of a thread is prepared, so that each processor ends processing of a thread by the execution of the term instruction.

FIG. 24 shows outlines of processing of a conventional multi-thread execution method. FIG. 24(a) shows a single program divided into three threads A, B and C. When processing the program by a single processor, one processor PE sequentially processes the threads A, B and C as shown in FIG. 24(b). On the other hand, by the multi-thread execution methods recited in the Literatures 1 to 3, one processor PE1 executes the thread A and while the processor PE1 executes the thread A, the thread B is generated in other processor PE2 by a fork instruction buried in the thread A and the processor PE2 executes the thread B as shown in FIG. 24(c). The processor PE2 also generates the thread C in a processor PE3 according to a fork instruction buried in the thread B. The processors PE1 and PE2 end processing of the threads according to term instructions buried immediately before start points of the threads B and C, respectively, and when executing the last instruction of the thread C, the processor PE3 executes the subsequent instruction (system call instruction in general). By thus simultaneously executing the threads by a plurality of processors in parallel to each other, higher performance can be obtained than that of sequential processing.

As another conventional multi-thread execution method, there exists a multi-thread execution method of generating the thread B in the processor PE2 and the thread C in the processor PE3, respectively, by conducting a plurality of times of forking from the processor PE1 which executes the thread A as shown in FIG. 24(d). In contrast to the model shown in FIG. 24(d), a multi-thread execution method in which such a constraint is imposed on the model as shown in FIG. 24(c) that a thread is allowed to generate a valid slave thread only once during its existence is referred to as one fork model. The one fork model enables drastic simplification of thread management and realizes a thread controller as hardware on a practical hardware scale. The present invention is premised on such one fork model.

Here, when there exists none of free processors that allow generation of a slave thread at the time of a fork instruction, either one of the following two methods is conventionally adopted.

(1) A processor executing a master thread waits which allows generation of a slave thread appears.

(2) A processor executing a master thread continues subsequent processing of the master thread while preserving the contents of a register file (a fork destination address and register contents) at a fork point in a physical register on the backside. The contents of the register file preserved in the backside physical register will be referred to to generate a slave thread at a time point where a free processor which allows generation of a slave thread appears.

For a master thread to generate a slave thread and make the slave thread to conduct predetermined processing, it is necessary to hand over a value of at least a register necessary for the slave thread among registers in the register file at a fork point of the master thread from the master thread to the slave thread. In order to reduce costs of data handover between the threads, the methods recited in the Literatures 2 and 3 have a mechanism for handing over a register value at the time of thread generation as hardware. This mechanism is to copy all the contents of the register file of the master thread to the slave thread at the time of thread generation. After the slave thread is generated, change of register values of the master thread and the slave thread will be made independently from each other, so that no data will be handed over between the threads using the register. Proposed as another conventional technique related to data handover between threads is a parallel processor system having a mechanism of individually transferring register values on a register basis according to an instruction.

Other than those mentioned above, in the MUSCAT recited in the Literature 2, numbers of dedicated instructions are prepared for flexibly controlling parallel operation of threads such as a synchronization instruction between threads.

As described above, in the conventional multi-thread execution methods, when none of free processors exists that allow generation of a slave thread, execution of a fork instruction of the master thread is kept waiting until a free processor appears, whereby execution might be kept waiting so long depending on circumstances to extremely reduce processing efficiency.

In order to improve reduction in processing efficiency caused by the processing stop, the method which enables processing of a master thread to be continued by preserving the contents of a register file at a fork point in a physical register on the backside requires at least two register files at the front and the back sides for each processor. Assume, for example, that 32 32-bit registers are accommodated in one register file, 32×32 bits of memory is required for each processor, resulting in an increase not negligible in an amount of hardware in an on chip parallel processor in which a number n of processors are integrated in one chip. Moreover, not only simple increase in an amount of hardware but also the need of saving and restoring a physical register on the backside together with a physical register on the front side at the time of process switch by an operating system (OS) leads to an increase in the volume of processing at the time of process switching to invite degradation of the performance due to an increase in overhead at the time of process switching.

As described above, in the conventional multi-thread execution methods, ending a thread needs description of a term instruction immediately before a slave thread start point without fail. Because one term instruction is required for one thread, the smaller the number of instructions a thread includes, the higher a rate of term instructions in the total number of instructions becomes. Since as well as other instructions, a term instruction is stored in instruction memory to become an object to be fetched, the problem of degradation of processing performance is caused due to an increase in an amount of hardware of the instruction memory and due to an increase in the number of instruction fetches.

SUMMARY OF THE INVENTION

The present invention is intended to solve those conventional problems and its object is to provide a novel multi-thread execution method and a parallel processor system which allow program processing to be executed smoothly without interruption of processing even when none of free processors exists that allow generation of a slave thread at the time of a fork instruction of a master thread while preventing an increase in an amount of hardware caused by the provision of numerous register files and an increase in overhead at the time of process switching by an OS.

Another object of the present invention is to reduce a necessary amount of instruction memory by reducing the number of term instructions for ending a thread and to improve processing performance by reducing the number of instruction fetches.

According to the first aspect of the invention, a multi-thread execution method of dividing a single program into a plurality of threads to execute the threads in parallel to each other by a plurality of processors, comprising the steps of determining a forkability of a slave thread into other processor in response to a fork instruction in a master thread, and when forkable, making fork of the slave thread and when not forkable, by a processor executing the master thread, successively executing an instruction subsequent to the fork instruction and then executing a group of instructions of the slave thread.

In the preferred construction, determination of the forkability is conducted only at a time point of the fork instruction.

In another preferred construction, determination of the forkability is made based on whether there exists other processor which can start execution of the slave thread at a time point of the fork instruction.

In another preferred construction, determination of the forkability is conducted at a time point of the fork instruction and when determining that the slave thread is not forkable, conducted at a time point after the fork instruction.

In another preferred construction, determination of the forkability at a time point of the fork instruction is made based on whether there exists other processor which can start execution of the slave thread, and determination of the forkability at a time point after the fork instruction is made based on whether there appears other processor which can start execution of the slave thread before a register file of the master thread is updated.

In another preferred construction, determination of the forkability at a time point of the fork instruction is made based on whether there exists other processor which can start execution of the slave thread, and determination of the forkability at a time point after the fork instruction is made based on whether there appears other processor which can start execution of the slave thread before a register to be handed over to the slave thread among registers in a register file of the master thread is updated.

In another preferred construction, when forking of the slave thread is conducted, a forked bit provided in the processor executing the master thread is set to validate a term instruction of a thread being executed by the processor in which the forked bit is set and invalidate a term instruction of a thread being executed by the processor in which the forked bit is not set.

In another preferred construction, at a time point of a fork instruction of the master thread, a fork destination address is preserved in a register provided in the processor executing the master thread and when forking of the slave thread is conducted, a forked bit provided in the processor executing the master thread is set, whereby the processor in which the forked bit is set and whose program counter value coincides with the fork destination address preserved in the register ends processing of a thread.

According to the second aspect of the invention, a multi-thread execution method in a parallel processor system which has a plurality of processors each individually having a program counter and a register file to simultaneously fetch, interpret and execute an instruction of a thread according to the program counter and has a function of causing other the processor to start execution of a slave thread starting at a fork destination address designated by a fork instruction in a master thread being executed by any of the processors, with a value of at least a register necessary for the slave thread in a register file of the master thread at a time point of the fork instruction handed over to the slave thread, comprising the steps of (a) at a time point of a fork instruction in the master thread, determining a forkability of a slave thread into other processor in response to the fork instruction based on whether there exists other processor which can start execution of the slave thread, (b) when forkable, making fork of the slave thread to set a forked bit provided in the processor executing the master thread and when not forkable, invalidating the fork instruction to successively execute an instruction subsequent to the fork instruction by the processor executing the master thread, and (c) validating a term instruction of a thread being executed by the processor in which the forked bit is set and invalidating a term instruction of a thread being executed by the processor in which the forked bit is not set.

According to the third aspect of the invention, a multi-thread execution method in a parallel processor system which has a plurality of processors each individually having a program counter and a register file to simultaneously fetch, interpret and execute an instruction of a thread according to the program counter and has a function of causing other the processor to start execution of a slave thread starting at a fork destination address designated by a fork instruction in a master thread being executed by any of the processors, with a value of at least a register necessary for the slave thread in a register file of the master thread at a time point of the fork instruction handed over to the slave thread, comprising the steps of (a) at a time point of a fork instruction in the master thread, preserving a fork destination address in a register provided in the processor executing the master thread, as well as determining a forkability of a slave thread into other processor in response to the fork instruction based on whether there exists other processor which can start execution of the slave thread, (b) when forkable, making fork of the slave thread to set a forked bit provided in the processor executing the master thread and when not forkable, invalidating the fork instruction to successively execute an instruction subsequent to the fork instruction by the processor executing the master thread, and (c) ending processing of a thread by the processor in which the forked bit is set and whose program counter value coincides with the fork destination address preserved in the register.

According to another aspect of the invention, a multi-thread execution method in a parallel processor system which has a plurality of processors each individually having a program counter and a register file to simultaneously fetch, interpret and execute an instruction of a thread according to the program counter and has a function of causing other the processor to start execution of a slave thread starting at a fork destination address designated by a fork instruction in a master thread being executed by any of the processors, with a value of at least a register necessary for the slave thread in a register file of the master thread at a time point of the fork instruction handed over to the slave thread, comprising the steps of (a) at a time point of a fork instruction in the master thread, preserving a fork destination address in a register provided in the processor executing the master thread, as well as determining a forkability of a slave thread into other processor in response to the fork instruction based on whether there exists other processor which can start execution of the slave thread, (b) when the determination at Step (a) is made that the slave thread is forkable, making fork of the slave thread to set a forked bit provided in the processor executing the master thread and when not forkable, holding forking by the fork instruction to successively execute an instruction subsequent to the fork instruction by the processor executing the master thread, (c) when holding forking at Step (b), in parallel to the execution of an instruction subsequent to the fork instruction, determining a forkability of a slave thread into other processor in response to the fork instruction based on whether there appears other processor which can start execution of the slave thread before the register file of the master thread is updated and at a time point where the determination is made that the slave thread is forkable, making fork of the slave thread according to the fork destination address preserved in the register to set a forked bit provided in the processor executing the master thread, and (d) validating a term instruction of a thread being executed by the processor in which the forked bit is set and invalidating a term instruction of a thread being executed by the processor in which the forked bit is not set.

According to another aspect of the invention, a multi-thread execution method in a parallel processor system which has a plurality of processors each individually having a program counter and a register file to simultaneously fetch, interpret and execute an instruction of a thread according to the program counter and has a function of causing other the processor to start execution of a slave thread starting at a fork destination address designated by a fork instruction in a master thread being executed by any of the processors, with a value of at least a register necessary for the slave thread in a register file of the master thread at a time point of the fork instruction handed over to the slave thread, comprising the steps of (a) at a time point of a fork instruction in the master thread, preserving a fork destination address in a register provided in the processor executing the master thread, as well as determining a forkability of a slave thread into other processor in response to the fork instruction based on whether there exists other processor which can start execution of the slave thread, (b) when the determination at Step (a) is made that the slave thread is forkable, making fork of the slave thread to set a forked bit provided in the processor executing the master thread and when not forkable, holding forking by the fork instruction to successively execute an instruction subsequent to the fork instruction by the processor executing the master thread, (c) when the determination is made at Step (a) that the slave thread is not forkable, in parallel to the execution of an instruction subsequent to the fork instruction, determining a forkability of a slave thread into other processor in response to the fork instruction based on whether there appears other processor which can start execution of the slave thread before the register file of the master thread is updated and at a time point where forkability is attained, making fork of the slave thread according to the fork destination address preserved in the register to set a forked bit provided in the processor executing the master thread, and (d) ending processing of a thread by the processor in which the forked bit is set and whose program counter value coincides with the fork destination address preserved in the register.

According to another aspect of the invention, a multi-thread execution method in a parallel processor system which has a plurality of processors each individually having a program counter and a register file to simultaneously fetch, interpret and execute an instruction of a thread according to the program counter and has a function of causing other the processor to start execution of a slave thread starting at a fork destination address designated by a fork instruction in a master thread being executed by any of the processors, with a value of at least a register necessary for the slave thread in a register file of the master thread at a time point of the fork instruction handed over to the slave thread, comprising the steps of (a) at a time point of a fork instruction in the master thread, preserving a fork destination address in a register provided in the processor executing the master thread, as well as determining a forkability of a slave thread into other processor in response to the fork instruction based on whether there exists other processor which can start execution of the slave thread, (b) when the determination at Step (a) is made that the slave thread is forkable, making fork of the slave thread to set a forked bit provided in the processor executing the master thread and when not forkable, holding forking by the fork instruction to successively execute an instruction subsequent to the fork instruction by the processor executing the master thread, (c) when the determination is made at Step (a) that the slave thread is not forkable, in parallel to the execution of an instruction subsequent to the fork instruction, determining a forkability of a slave thread into other processor in response to the fork instruction based on whether there appears other processor which can start execution of the slave thread before a register to be handed over to the slave thread among registers in the register file of the master thread is updated and at a time point where the determination is made that the slave thread is forkable, making fork of the slave thread according to the fork destination address preserved in the register to set a forked bit provided in the processor executing the master thread, and (d) validating a term instruction of a thread being executed by the processor in which the forked bit is set and invalidating a term instruction of a thread being executed by the processor in which the forked bit is not set.

According to another aspect of the invention, a multi-thread execution method in a parallel processor system which has a plurality of processors each individually having a program counter and a register file to simultaneously fetch, interpret and execute an instruction of a thread according to the program counter and has a function of causing other processor to start execution of a slave thread starting at a fork destination address designated by a fork instruction in a master thread being executed by any of the processors, with a value of at least a register necessary for the slave thread in a register file of the master thread at a time point of the fork instruction handed over to the slave thread, comprising the steps of (a) at a time point of a fork instruction in the master thread, preserving a fork destination address in a register provided in the processor executing the master thread, as well as determining a forkability of a slave thread into other processor in response to the fork instruction based on whether there exists other processor which can start execution of the slave thread, (b) when the determination at Step (a) is made that the slave thread is forkable, making fork of the slave thread to set a forked bit provided in the processor executing the master thread and when not forkable, holding forking by the fork instruction to successively execute an instruction subsequent to the fork instruction by the processor executing the master thread, (c) when the determination is made at Step (a) that the slave thread is not forkable, in parallel to the execution of an instruction subsequent to the fork instruction, determining a forkability of a slave thread into other processor in response to the fork instruction based on whether there appears other processor which can start execution of the slave thread before a register to be handed over to the slave thread among registers in the register file of the master thread is updated and at a time point where the determination is made that the slave thread is forkable, making fork of the slave thread according to the fork destination address preserved in the register to set a forked bit provided in the processor executing the master thread, and (d) ending processing of a thread by the processor in which the forked bit is set and whose program counter value coincides with the fork destination address preserved in the register.

According to a further aspect of the invention, a parallel processor system for executing a single program divided into a plurality of threads in parallel to each other by a plurality of processors, comprises means for determining a forkability of a slave thread into other processor in response to a fork instruction in a master thread, and means for making fork of the slave thread when forkable and by a processor executing the master thread, successively executing an instruction subsequent to the fork instruction and then executing a group of instructions of the slave thread when not forkable.

In the preferred construction, the forkability determination means conducts determination of the forkability only at a time point of the fork instruction.

In another preferred construction, the forkability determination means conducts determination of the forkability based on whether there exists other processor which can start execution of the slave thread at a time point of the fork instruction.

In another preferred construction, the forkability determination means conducts determination of the forkability at a time point of the fork instruction and when determining that the slave thread is not forkable, conducts determination also at a time point after the fork instruction.

In another preferred construction, the forkability determination means conducts determination of the forkability at a time point of the fork instruction based on whether there exists other processor which can start execution of the slave thread, and conducts determination of the forkability at a time point after the fork instruction based on whether there appears other processor which can start execution of the slave thread before a register file of the master thread is updated.

In another preferred construction, the forkability determination means conducts determination of the forkability at a time point of the fork instruction based on whether there exists other processor which can start execution of the slave thread, and conducts determination of the forkability at a time point after the fork instruction based on whether there appears other processor which can start execution of the slave thread before a register to be handed over to the slave thread among registers in a register file of the master thread is updated.

In another preferred construction, the parallel processor system may further comprise means for setting a forked bit provided in the processor executing the master thread when forking of the slave thread is conducted, and means for validating a term instruction of a thread being executed by the processor in which the forked bit is set and invalidating a term instruction of a thread being executed by the processor in which the forked bit is not set.

In another preferred construction, the parallel processor system may further comprise means for preserving, at a time point of a fork instruction of the master thread, a fork destination address in a register provided in the processor executing the master thread, means for setting a forked bit provided in the processor executing the master thread when forking of the slave thread is conducted, wherein the processor in which the forked bit is set and whose program counter value coincides with the fork destination address preserved in the register ends processing of a thread.

Since according to the present invention, determination is made whether fork into a slave thread in other processor by a fork instruction in a master thread is possible or not and when forkable, a processor executing the master thread will successively execute a subsequent instruction, no processing is interrupted and because a group of instructions of a slave thread is executed after the subsequent instruction of the master thread is executed, program processing can be conducted smoothly. Moreover, since processing of a slave thread is conducted by the same processor as that of a master thread, the need of saving the contents of a register file at the fork point in a register file on the backside is eliminated to prevent an increase in an amount of hardware caused by the provision of numerous register files and an increase in overhead at the time of process switching by an OS.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the Drawings

FIGS. 10(a) and 10(b) are diagrams showing one example of a sequential processing program and a parallelization program generated therefrom;

FIG. 13 is a diagram showing another example of a parallelization program generated from a sequential processing program;

FIG. 21 is a diagram showing a further example of a parallelization program generated from a sequential processing program;

FIG. 22 is a diagram showing a still further example of a parallelization program generated from a sequential processing program;

FIG. 23 is a diagram showing a still further example of a parallelization program generated from a sequential processing program.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 24:
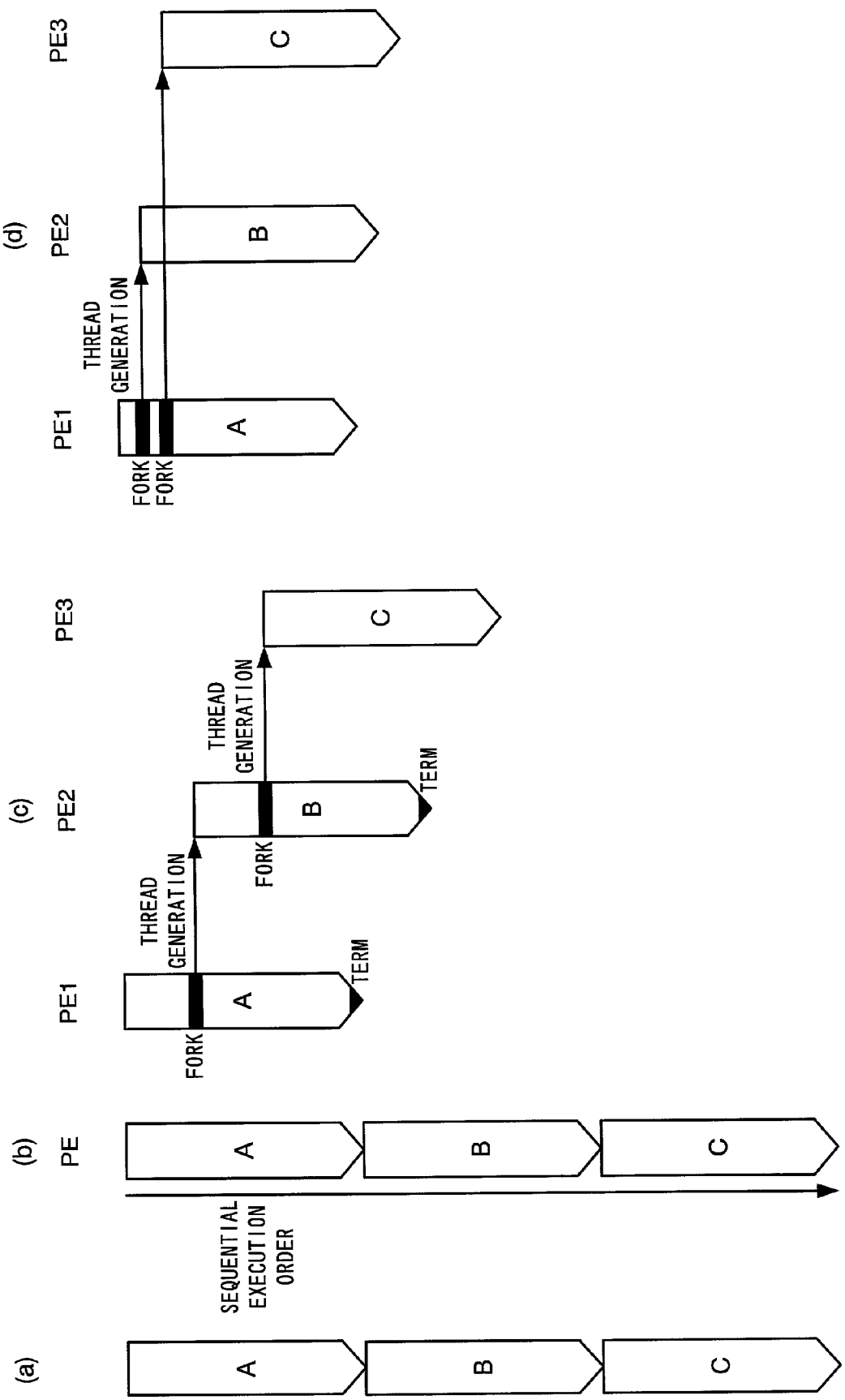
FIGS. 24(a)-24(d) are diagrams showing outlines of processing of a conventional multi-thread execution method.

First, description will be made of a multi-thread execution method according to the present invention with respect, as an example, to a single program divided into three threads A, B and C which is illustrated in FIG. 24(a).

(1) First Multi-thread Execution Method

Figure 1:
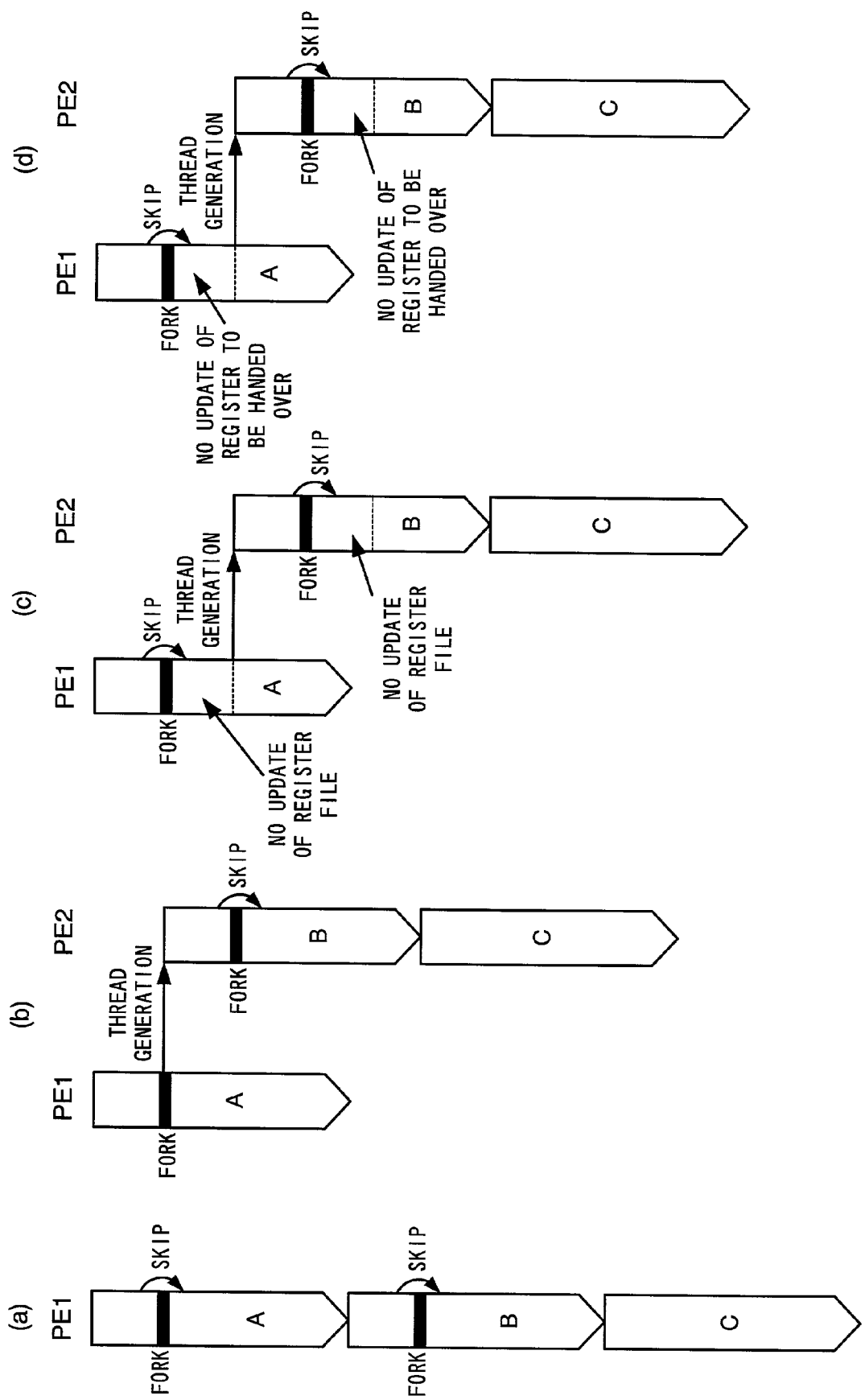
FIGS. 1(a) 1(d) are diagrams showing concept of a multi-thread execution method of the present invention.

As shown in FIG. 1(a), one processor PE1 executes the thread A and while the thread A is being executed by the processor PE1, when the execution reaches a fork instruction, determination is made whether there exists other processor which can start execution of the slave thread B. In FIG. 1(a), since no such processor exists, the fork instruction in question is invalidated to successively execute processing of a subsequent instruction and start processing of the thread B subsequently to the processing of the thread A. Similarly, since in FIG. 1(a), the fork instruction of the thread B is not executable, the fork instruction is invalidated to successively execute processing of the subsequent instruction and then execute processing of the thread C. The thread execution sequence in this case is A-B-C, the same as the sequential execution order by a single processor as will be described with reference to FIG. 24(b), which enables smooth execution of program processing.

FIG. 1(b) shows an execution sequence conducted when the thread A is forked into the thread B but the thread B can not be forked into the C. In this case, since the processor PE1 executing the thread A forks the thread into the thread B, it executes only the thread A, while the processor PE2 fails to fork the thread B into the thread C, so that it executes the thread C successively to the thread B.

Although no fork can be made immediately in the first multi-thread execution method unless other processor exists which can start execution of a slave thread at a time point of a fork instruction, determination whether fork is possible or not taking update of a register file into consideration as in the second and the third inventions is unnecessary, whereby simplification of control and reduction in an amount of hardware are possible.

(2) Second Multi-Thread Execution Method

As shown in FIG. 1(c), one processor PE1 executes the thread A and while the thread A is being executed by the processor PE1, when the execution reaches a fork instruction, the determination is made whether there exists other processor which can start execution of the slave thread B. In FIG. 1(c), since no such processor exists, the fork instruction is held and the processor PE1 continues processing of the subsequent instruction. Then, there appears other processor PE2 which can start execution of the slave thread B before the register file of the thread A is updated, so that the determination is made that fork is possible to generate the thread B in the processor PE2 and start execution of the same. In the processor PE2, when execution reaches a fork instruction in the thread B, determination is made whether there exists other processor which can start execution of the slave thread C. In FIG. 1(c), since no such processor exists, the fork instruction is held and the processor PE2 continues processing of the subsequent instruction. Also in FIG. 1(c), since there appears none of other processors that can start execution of the slave thread C before the register file of the thread B is updated, fork is given up and upon completion of the processing of the thread B, the processor PE2 successively executes processing of the thread C.

When there exists none of other processors that can start execution of the slave thread B before the register file of the thread A is updated, the processor PE1 executes the thread B successively to the thread A and during the execution of the thread B, when there exists none of other processors that can start execution of the slave thread C before the register file of the thread B is updated, the processor PE1 also executes the thread C successively to the thread B. The thread execution sequence at this time will be the same as that of FIG. 1(a).

Since according to the second multi-thread execution method, even if fork is impossible at the time of a fork instruction, forking is conducted when there appears other processor which can start execution of a slave thread before the register file is updated, a forkability is higher than that in the first invention to improve parallelism of thread execution.

(3) Third Multi-Thread Execution Method

As shown in FIG. 1(d), one processor PE1 executes the thread A and while the thread A is being executed by the processor PE1, when the execution reaches a fork instruction, determination is made whether there exists other processor which can start execution of the slave thread B. In FIG. 1(d), since no such processor exists, the fork instruction is held and the processor PE1 continues processing of the subsequent instruction. Then, in FIG. 1(d), there appears other processor PE2 which can start execution of the slave thread B before the value of a register to be handed over to the slave thread B in the register file of the thread A is updated, so that the determination is made that fork is possible to generate the thread B in the processor PE2 and start execution of the same. In the processor PE2, when execution reaches a fork instruction in the thread B, determination is made whether there exists other processor which can start execution of the slave thread C. In FIG. 1(d), since no such processor exists, the fork instruction is held and the processor PE2 continues processing of the subsequent instruction. Also in FIG. 1(d), since there appears none of other processors that can start execution of the slave thread C before the value of a register to be handed over to the slave thread C in the register file of the thread B is updated, forking is given up and upon completion of the processing of the thread B, the processor PE2 successively executes processing of the thread C.

When there exists none of other processors that can start execution of the slave thread B before the value of a register to be handed over to the slave thread B in the register file of the thread A is updated, the processor PE1 executes the thread B successively to the thread A and during the execution of the thread B, when there exists none of other processors that can start execution of the slave thread C before the register value to be handed over to the slave thread C in the register file of the thread B is updated, the processor PE1 also executes the thread C successively to the thread B. The thread execution sequence at this time will be the same as that of FIG. 1(a).

Since according to the third multi-thread execution method, even if a register file of a master thread is updated, fork is conducted unless the update is made of a register to be handed over to a slave thread, a forkability can be more increased than that of the second invention, thereby improving parallelism of thread execution.

(4) Fourth Multi-thread Execution Method

In the fourth multi-thread execution method, a term instruction is placed immediately before a start point of a slave thread as in conventional art. In FIGS. 1(b), (c) and (d), because the processor PE1 forks the master thread A into the slave thread B, a forked bit is set. On the other hand, because the processor PE2 fails to fork the master thread B into the slave thread C, no forked bit is set. Therefore, in the processor PE1, the term instruction immediately before the start point of the slave thread B is validated, so that execution of the master thread A completes processing of the thread. On the other hand, in the processor PE2, the term instruction immediately before the start point of the slave thread C is invalidated, so that execution of a group of instructions of the slave thread C is started after the execution of the master thread B without stopping the thread processing.

(5) Fifth Multi-thread Execution Method

Unlike the conventional art, no term instruction exists immediately before a start point of a slave thread in the fifth multi-thread execution method. In FIGS. 1(b), (c) and (d), the processor PE1 preserves a fork destination address (start address of the thread B) in the register at the time of a fork instruction of the thread A and the slave thread B is forked from the master thread A, so that a forked bit is set. On the other hand, although the processor PE2 preserves a fork destination address (start address of the thread C) in the register at the time of a fork instruction of the thread B, the slave thread C is not forked from the master thread B, so that no forked bit is set. Therefore, the processor PE1 terminates thread processing at a time point where the value of a program counter coincides with the fork destination address (start address of the thread B) preserved in the register. On the other hand, the processor PE2 refrains from terminating the thread processing and proceeds to the processing of the group of instructions of the slave thread C even when the value of the program counter coincides with the fork destination address (start address of the thread B) preserved in the register.

In the present invention, handover of a register value from a master thread to a slave thread at the time of fork is conducted targeting only the registers in a register file of the master thread necessary at least for a slave thread at the time of a fork instruction. As a specific register handover mechanism therefor, all the contents of a register file of a master thread are copied to a register file of a slave thread at the time of thread generation as recited in the Literatures 2 and 3 or only a register value necessary for reducing an amount of register transfer may be individually transferred on a register basis according to an instruction.

Next, embodiments of the present invention will be described in detail with reference to the drawings.

First Embodiment

Figure 2:
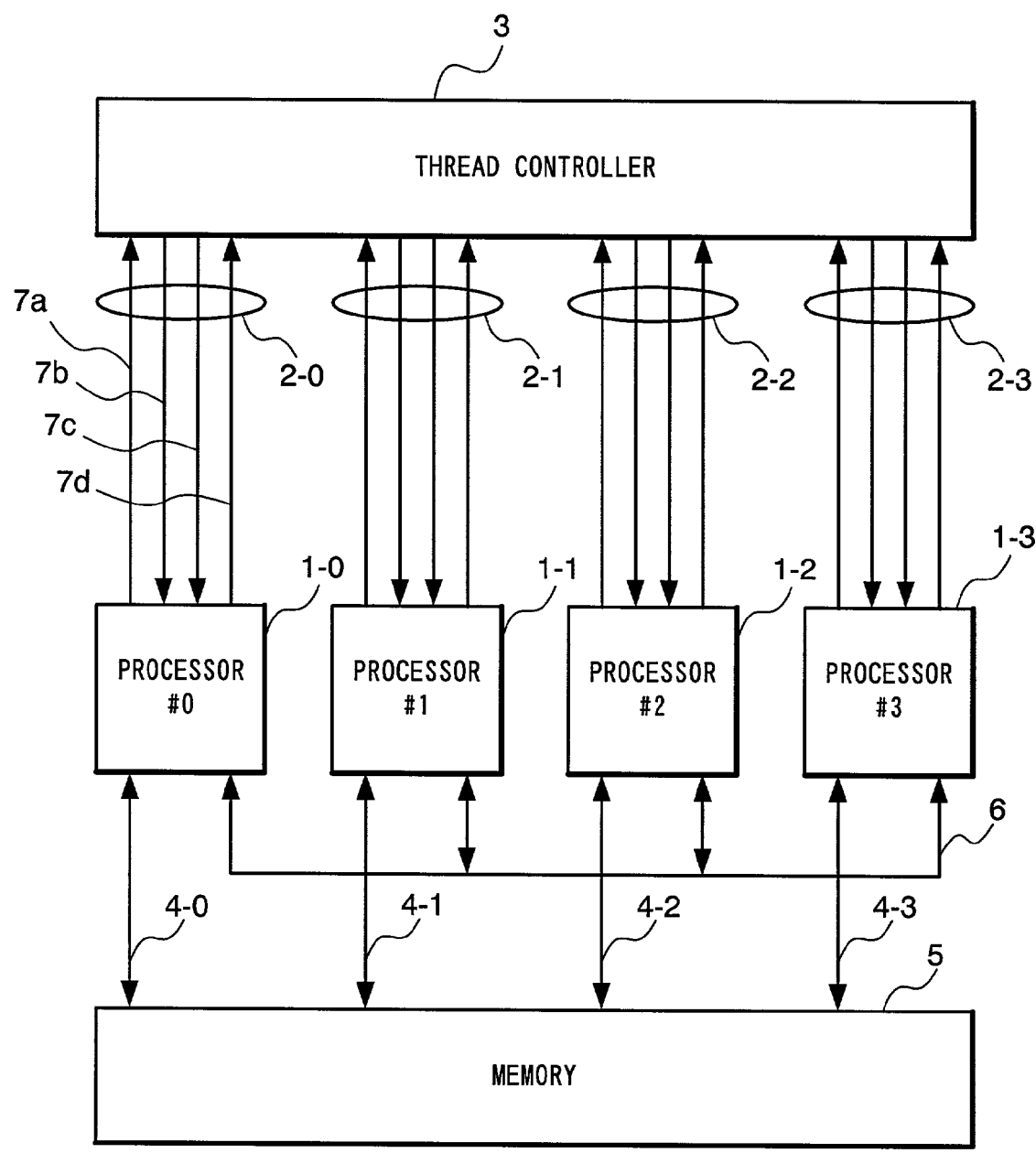
FIG. 2 is a block diagram showing one example of a parallel processor system according to a first embodiment of the present invention.

With reference to FIG. 2, one example of a parallel processor system of the present invention is a 4-thread parallel execution type processor in which four processors $1\text{-}i$ (i=0~3) are connected to a thread controller 3 through a signal line $2\text{-}i$ and to a shared memory 5 as well through a signal line $4\text{-}i$. In addition, the processors $1\text{-}i$ are connected to each other through a communication bus 6. Although the present embodiment is described taking a 4-thread parallel execution type processor as an example, the present invention is applicable in general to an n ($\geq 2$) thread parallel execution type processor such as an 8-thread or 16-thread parallel execution type processor. All the processors $1\text{-}i$, the memory 5 and the thread controller 3 operate in synchronization with a clock. Preferably, all the processors $1\text{-}i$ are integrated on one semiconductor chip together with the memory 5 and the thread controller 3.

Each processor $1\text{-}i$ individually has a program counter (hereinafter referred to as PC) and a register file and has a function of simultaneously fetching, interpreting and executing instructions of a thread in the memory 5. Execution of a thread at each processor $1\text{-}i$ is started upon transmission of a thread start request 7c with a target PC value from the thread controller 3 through the signal line $2\text{-}i$. The processor $1\text{-}i$ having ended the execution of the thread transmits a thread stop notice 7d to the thread controller 3 through the signal line $2\text{-}i$. Upon reception of the thread stop notice 7d by the thread controller 3, the processor $1\text{-}i$ in question is managed as a free processor and is allowed to start execution of a new thread.

Each processor $1\text{-}i$ is capable of making fork of a slave thread in other processor $1\text{-}j$ (i≠j) in response to a fork instruction existing in a master thread in execution. At that time, the processor $1\text{-}i$ transmits a fork request 7a with a fork destination address (start PC value) of the slave thread to the thread controller 3 through the signal line $2\text{-}i$. Upon receiving the fork request 7a, the thread controller 3 checks whether there exists other processor $1\text{-}j$ which can start execution of a slave thread and when it exists, the controller transmits the thread start request 7c with a fork destination address to the other processor $1\text{-}j$ in question, as well as returning a fork response 7b which designates the number of the other processor $1\text{-}j$ in question to the processor $1\text{-}i$ as a fork requesting source. At this time point, fork is considered to have been executed for the first time, so that the processor $1\text{-}i$ having received the fork response 7b copies all the contents of the register file of the master thread to the register file of the processor $1\text{-}j$ as a fork destination through the communication bus 6 or copies only a register value necessary for the slave thread in question, thereby conducting register handover.

On the other hand, when there exists none of other processors which can start execution of a slave thread, the thread controller 3 abandons the current fork request 7a. As a result, the fork instruction is invalidated.

Figure 3:
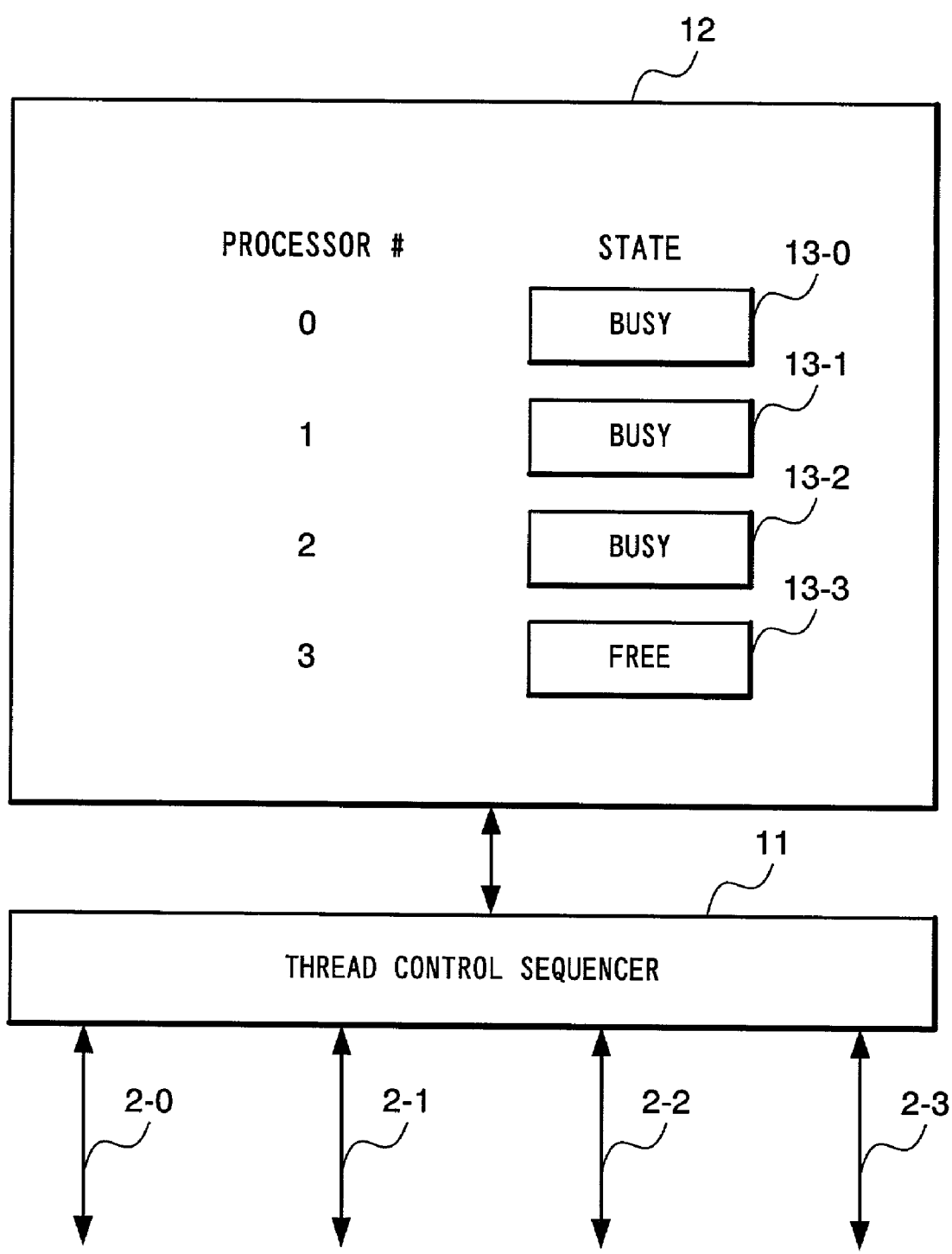
FIG. 3 is a block diagram showing an example of a structure of a thread controller in the parallel processor system according to the first embodiment of the present invention.

With reference to FIG. 3, one example of the thread controller 3 is composed of a thread control sequencer 11 and a processor state table 12. The processor state table 12 has an entry $13\text{-}i$ one-to-one corresponding to the processor $1\text{-}i$. Individual entry $13\text{-}i$ is used for recording whether the corresponding processor $1\text{-}i$ is at a busy state or at a free state. The thread control sequencer 11 controls thread generation and thread stop in each processor $1\text{-}i$ by using the processor state table 12. An example of processing of the thread control sequencer 11 conducted when receiving the fork request 7a and the thread stop notice 7d from the processor $1\text{-}i$ is shown in FIGS. 4 and 5.

Figure 4:
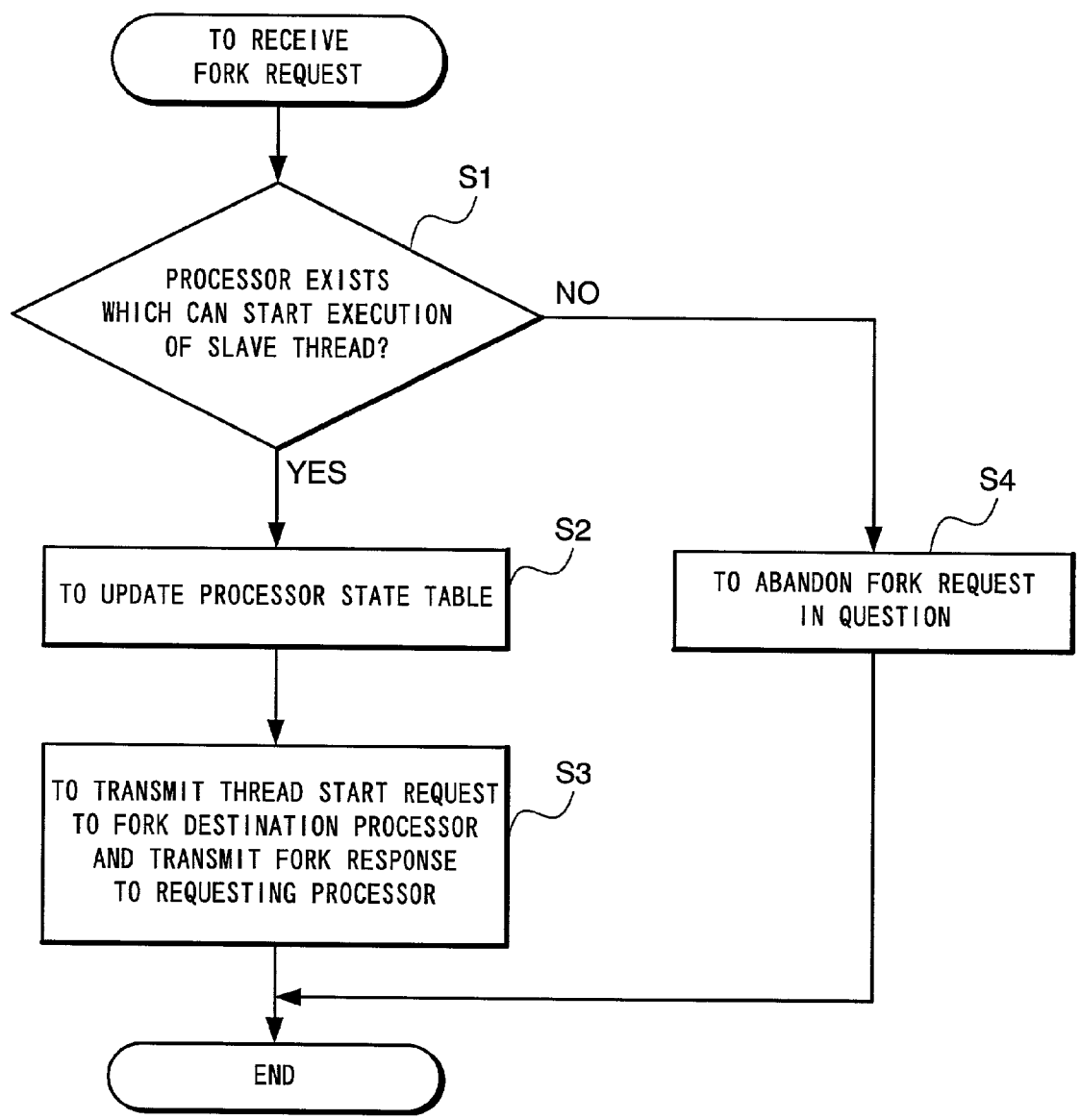
FIG. 4 is a flow chart showing an example of processing executed when a thread control sequencer of the thread controller in the parallel processor system of the present invention receives a fork request from a processor.
Figure 5:
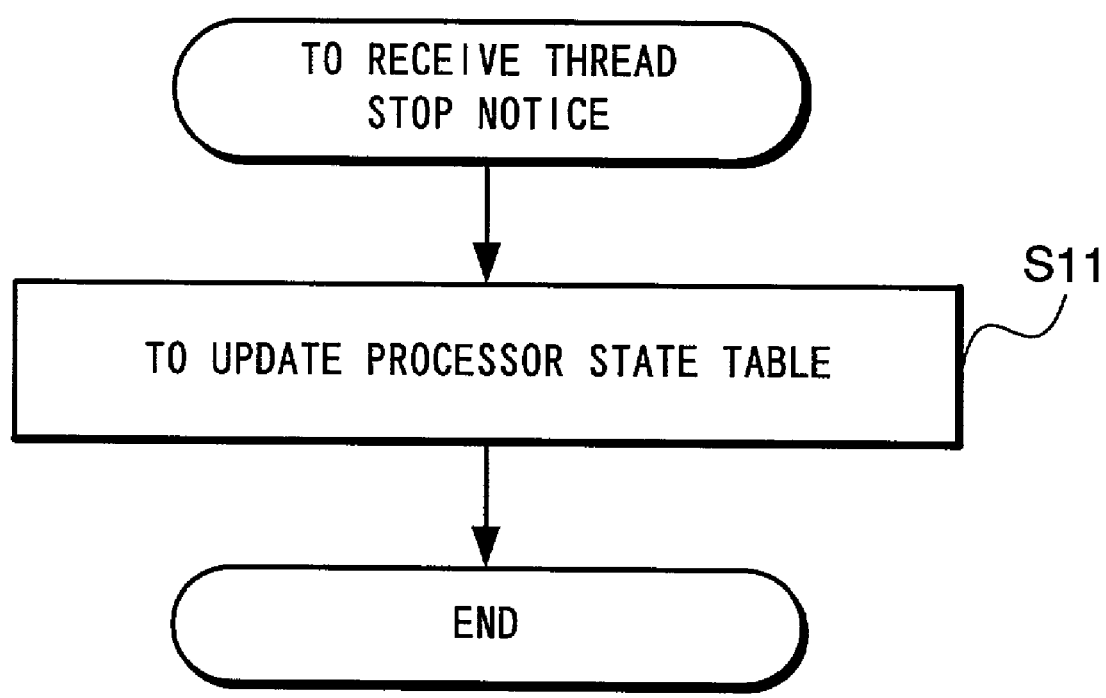
FIG. 5 is a flow chart showing an example of processing conducted when the thread control sequencer of the thread controller in the parallel processor system of the present invention receives a thread stop notice.

With reference to FIG. 4, upon receiving the fork request 7a from any of the processors $1\text{-}i$ at certain clock timing, the thread control sequencer 11 checks whether there exists a processor which can start execution of a slave thread with reference to the processor state table 12 (Step S1). As recited in the Literatures 1 to 3, in a model in which a processor whose slave thread can be forked from a processor $1\text{-}i$ is limited to one of processors adjacent to the processor $1\text{-}i$ (for the processor $1\text{-}0$, the processor $1\text{-}1$, for the processor $1\text{-}1$, the processor $1\text{-}2$, for the processor $1\text{-}2$, the processor $1\text{-}3$ and for the processor $1\text{-}3$, the processor $1\text{-}0$) for the purpose of simplifying thread control (this model will be referred to as a ring-type fork model hereinafter), with reference to the entry $13\text{-}j$ of the processor state table 12 corresponding to the processor $1\text{-}j$ adjacent to the processor $1\text{-}i$, when the entry indicates the free state, the determination can be made that there exists a processor which can start execution of a slave thread, while when the entry indicates the busy state, the determination can be made that no such processor exists.

When the processor $1\text{-}j$ which can start execution of a slave thread exists, the thread control sequencer 11 changes the entry $13\text{-}j$ corresponding to the processor $1\text{-}j$ in question in the processor state table 12 from the free state to the busy state (Step S2) to transmit the thread start request 7c with a fork destination address accompanying the fork request 7a to the fork destination processor $1\text{-}j$, as well as returning the fork response 7b which designates the fork destination processor $1\text{-}j$ to the requesting source processor $1\text{-}i$ (Step S3). Since in the ring-type fork model, a fork destination processor is specified in advance, it is unnecessary to designate a fork destination processor $1\text{-}j$ by the fork response 7b.

On the other hand, when there exists no processor $1\text{-}j$ which can start execution of the slave thread, the thread control sequencer 11 abandons the fork request 7a in question (Step S4).

With reference to FIG. 5, upon receiving the thread stop notice 7d from any of the processors $1\text{-}i$, the thread control sequencer 11 changes the entry $13\text{-}i$ of the processor control table 12 corresponding to the processor $1\text{-}i$ in question from the busy state to the free state (Step S11).

Figure 6:
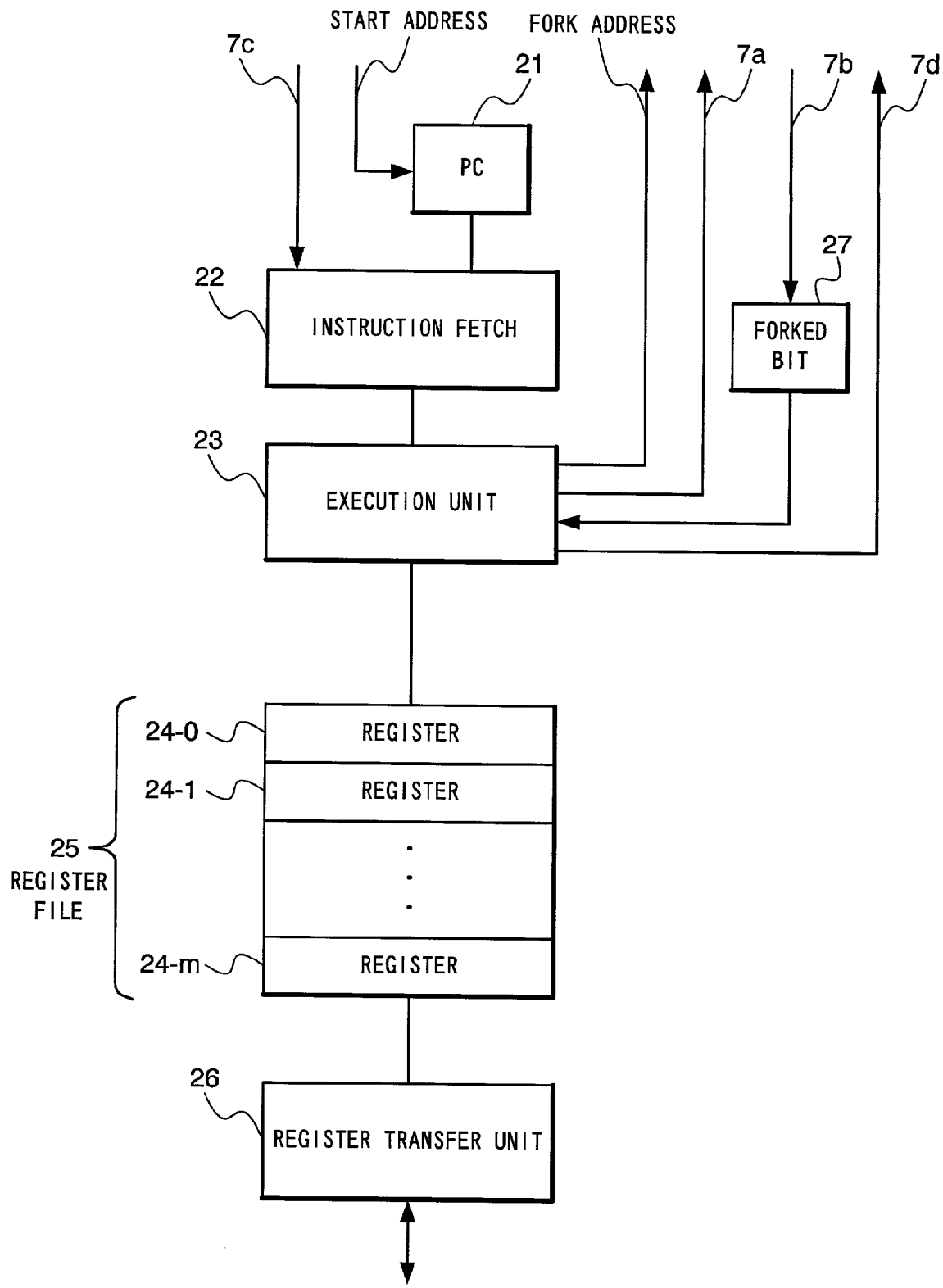
FIG. 6 is a block diagram showing an example of a structure of a processor in the parallel processor system of the present invention.

With reference to FIG. 6, each processor $1\text{-}i$ is composed of a PC 21 in which a start address value accompanying the thread start request 7c transmitted from the thread controller 3 is set and appropriately incremented thereafter, an instruction fetch unit 22 for fetching an instruction of a thread from the memory 5 according to the PC21, an execution unit 23 for decoding a fetched instruction and executing the same, a register file 25 as a set of general-purpose registers 24-0~24-m, a register transfer unit 26 for transferring the contents of the register file 25 to a fork destination processor through the communication bus 6 and a forked bit 27 which is set by the fork response 7b to the fork request 7a accompanied by a fork destination address which is transmitted from the execution unit 23 to the thread controller 3 at the time of fork instruction execution, in which the value of the forked bit 27 is input to the execution unit 23.

The execution unit 23 determines whether the forked bit 27 is set or not at the time of decoding of a term instruction in a thread and when it is set, effectively executes the term instruction in question to end the processing of the thread. At that time, the unit 23 transmits the thread stop notice 7d to the thread controller 3. On the other hand, when the forked bit 27 is not set, the unit 23 invalidates the term instruction in question to continue processing of a subsequent instruction according to the PC21. In addition, the register transfer unit 26 starts register transfer to a fork destination processor at the timing when the forked bit 27 is set. The register transfer unit 26 transmits a register value of the register file 25 and a register number (register address) to a register file of the fork destination processor for each of as many registers as can be transferred at once by a bus width of the communication bus 6, so that the register file 25 on the reception side rewrites the relevant register.

Figure 7:
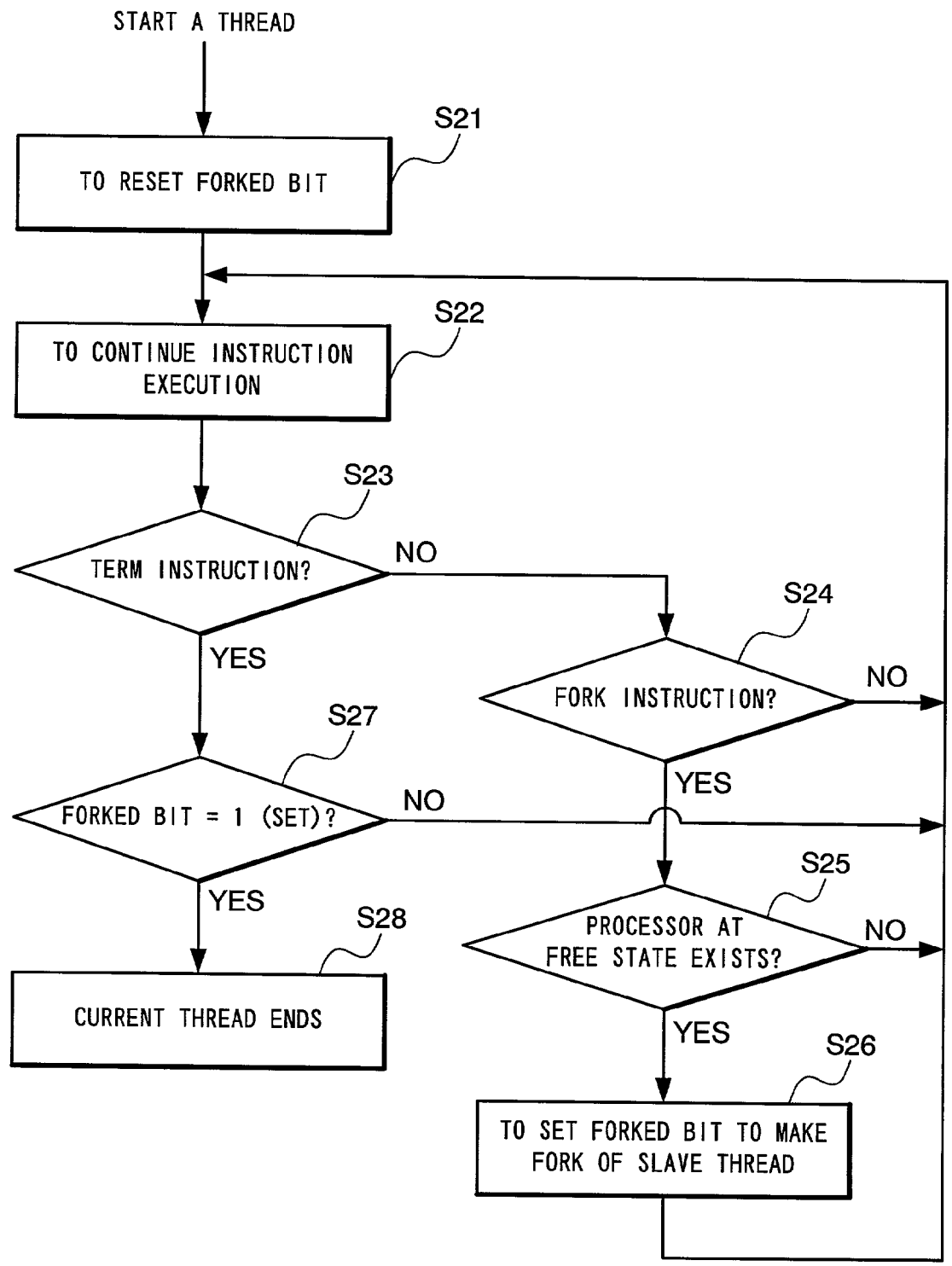
FIG. 7 is a flow chart showing one example of processing conducted by the processor and the thread controller from the start to the end of a thread in the parallel processor system of the present invention.

Next, operation of the multi-thread execution method according to the present embodiment will be described with reference to the flow chart of FIG. 7 which shows one example of processing conducted by the processor 1-i and the thread controller 3 from the start to the end of a thread.

At the start of execution of one thread by the processor 1-i based on the thread start request 7c from the thread controller 3, the forked bit 27 of the processor 1-i in question is reset (Step S21) to continuously execute fetch, decoding and execution of an instruction of the thread (Step S22). FIG. 7 illustrates an outline of processing taking, in particular, notice of a term instruction and a fork instruction among the instructions in the thread.

In a case where an instruction decoded by the execution unit 23 is a fork instruction (YES at Step S24), the execution unit 23 transmits the fork request 7a designating a fork destination address to the thread controller 3 which responsively checks whether there exists other processor 1-j at the free state which can start execution of a slave thread in a manner as described above (Step S25). When other processor 1-j at the free state exists, the thread controller 3 sets the forked bit 27 of the processor 1-i as described above, as well as sending the thread start request 7c to the other processor 1-j, thereby making fork of a slave thread (Step S26). At that time, the register transfer unit 26 of the processor 1-i transmits the contents of the register file 25 to the processor 1-j through the communication bus 6 to write the same into the register file 25 of the processor 1-j. On the other hand, when there exists none of other processors that can start execution of the slave thread, the thread controller 3 abandons the fork request 7a transmitted from the processor 1-i to invalidate the fork instruction. After the execution of the fork instruction, the processor 1-i continues execution of a subsequent instruction according to the PC21 (Step S22).

In a case where the instruction decoded by the execution unit 23 is a term instruction (YES at Step S23), if the forked bit 27 is set (YES at Step S27), the execution unit 23 ends the processing of the thread by executing the term instruction in question (Step S28). When the forked bit 27 is not set, however, the unit 23 invalidates the term instruction in question to continue execution of a subsequent instruction according to the PC21 (Step S22).

Figure 8:
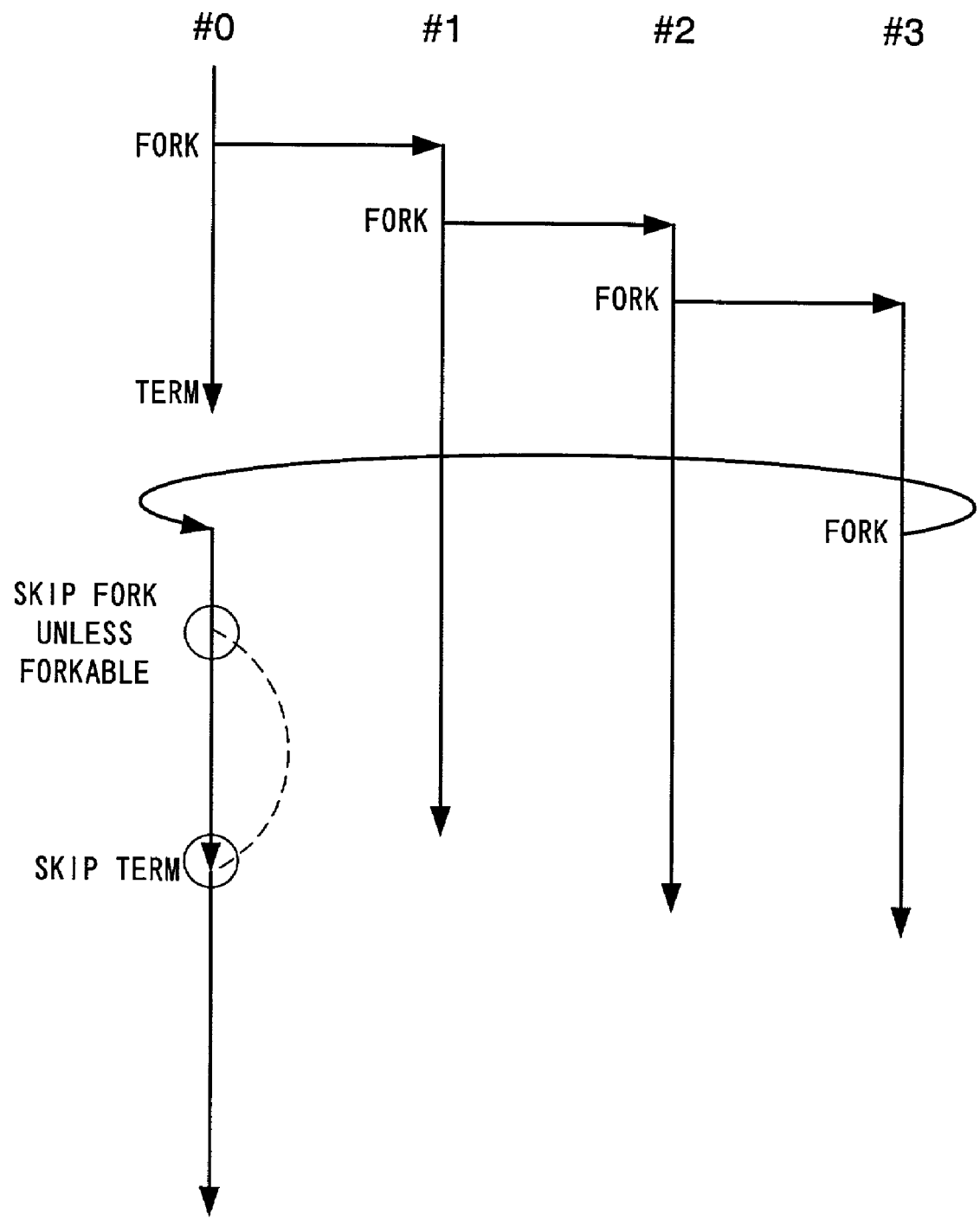
FIG. 8 is a diagram showing one example of an execution sequence of the multi-thread execution method according to the present invention applied to a ring-type fork model.

One example of an execution sequence of the multi-thread execution method according to the present embodiment applied to a ring-type fork model is shown in FIG. 8. In FIG. 8, fork into a slave thread is made from a processor #0 to its adjacent processor #1, from the processor #1 to its adjacent processor #2 and from the processor #2 to its adjacent processor #3, respectively. In addition, since the processor #0 is at the free state at a fork point of the processor #3, fork into slave thread from the processor #3 to the processor #0 succeeds. At a fork point of the thread newly generated in the processor #0, fork is impossible because the adjacent processor #1 is at the busy state, so that fork is skipped (invalidated). Therefore, the processor #0 skips (invalidates) a term instruction of the thread in question and executes by itself a slave thread which should be originally executed by the adjacent processor #1.

Next, description will be made of a method of generating a parallelization program to be executed in a multi-thread execution method according to the present embodiment.

Figure 9:
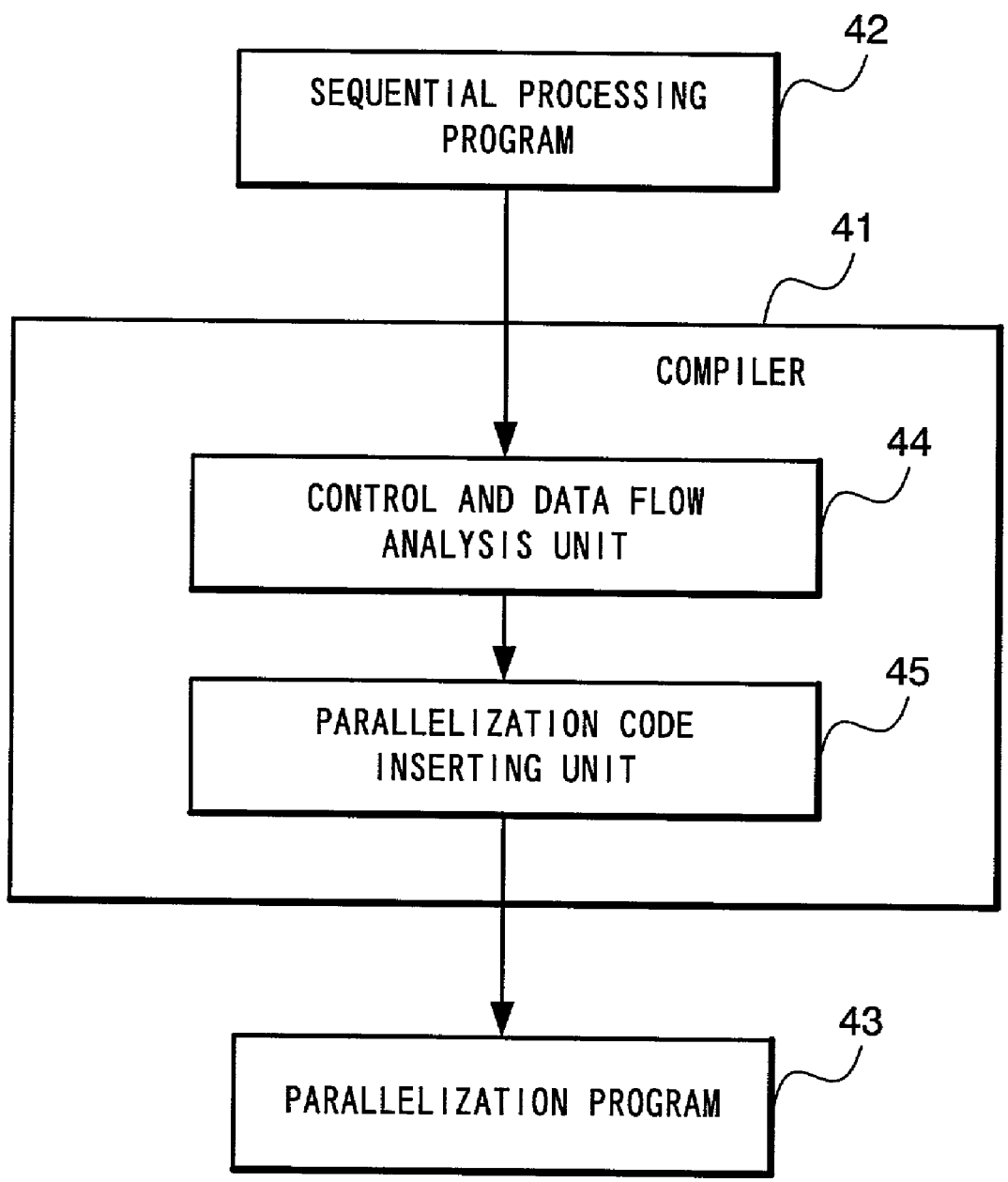
FIG. 9 is a block diagram showing an example of a structure of a compiler for generating a parallelization program intended for the multi-thread execution method of the present invention.

With reference to FIG. 9, a compiler 41 receives input of a sequential processing program 42, analyzes a control flow and a data flow of the sequential processing program 42 by means of a control and data flow analysis unit 44 to divide a basic block or a plurality of basic blocks into a unit of parallelization, that is, a thread, and then inserts a code for parallelization by means of a parallelization code inserting unit 45 to generate and output a parallelization program 43 which is divided into a plurality of threads. The present invention statically guarantees in the parallelization program 43 the one fork limitation that each thread in the parallelization program 43 generates a valid slave thread only once during its existence.

Parallelization codes include a fork instruction and a term instruction. In the present embodiment, a fork instruction is inserted at a fork point and a term instruction is inserted immediately before a start point of a slave thread at the time of generation of a parallelization program. In addition, as described above, since in the present embodiment, when forking is impossible, a fork instruction is invalidated and when the fork instruction is invalidated, its corresponding term instruction is invalidated as well, the compiler 41 generates the parallelization program 43 which enables processing equivalent to the sequential processing program 42 even if a fork instruction and a term instruction are invalidated. In general, when a control flow of a state where fork instructions and term instructions are all eliminated from the parallelization program 43 is equivalent to the control flow of the sequential processing program 42, the program will be the parallelization program 43 that guarantees operation of the sequential processing program 42.

FIG. 10(a) shows one example of the sequential processing program 42. The sequential processing program 42 in this example is described using an instruction set of the RISC processor of MIPS Technology INC. of US such that "5" is added (addu) to a register r14, the contents of the register r14 are stored (sw) at an address indicated by a register r16 and the contents of "the address+4" indicated by the register r16 are loaded (lw) into a register r1 to execute a loop. Described in the loop is the processing of calling a function (jal) with _func as a start address, subtracting (sub)

1 from the value of the register r1, comparing the register r1 and a register r0 (constantly 0) and when they are not equal, branching (bne) to _loop.

FIG. 10(b) shows one example of the parallelization program 43 generated by compiling the sequential processing program 42 illustrated in FIG. 10(a) by the compiler 41. In this example, immediately before an addu instruction, one fork instruction (fork) with _th1 as a fork address is inserted and immediately before the fork address _th1, a term instruction (term) is inserted. In addition, in the slave thread, one fork instruction with _th2 as a fork destination address is inserted and immediately before the fork destination address _th2, a term instruction is inserted.

Eliminating all the fork instructions and the term instructions from the parallelization program 43 shown in FIG. 10(b) has a program whose control flow is the same as that of the sequential processing program 42 shown in FIG. 10(a), and it can be seen that the program is a parallelization program in which processing executed in the sequential processing program 42 is guaranteed even if a fork instruction and a term instruction are invalidated.

Since the parallelization program 43 shown in FIG. 10(b) includes none of information about a register to be handed over to a slave thread among registers in a register file of a master thread, all the contents of the register file of the master thread will be transferred at the time of fork of a slave thread. It is of course possible as in a third embodiment which will be described later to analyze a register to be handed over to a slave thread at the time of compiling and describe information about the register to be handed over in the parallelization program 43 to transfer only a register necessary for the slave thread among the contents of the register file of the master thread at the time of fork of the slave thread.

Second Embodiment

The present embodiment differs from the first embodiment in that the need of a term instruction in a parallelization program is eliminated. In the following, the present embodiment will be described mainly with respect to the difference from the first embodiment.

Figure 11:
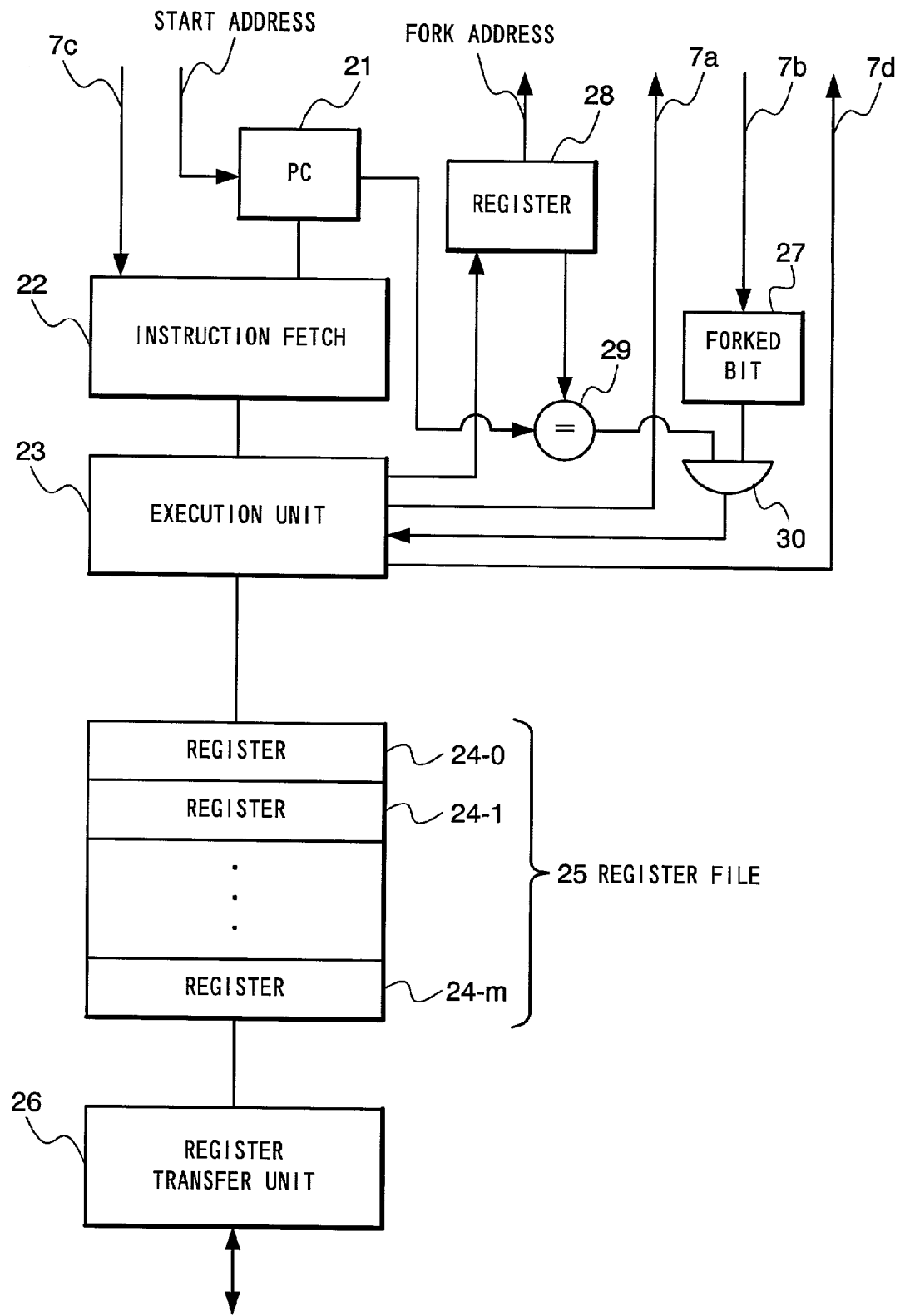
FIG. 11 is a block diagram showing another example of a structure of a processor in a parallel processor system according to a second embodiment of the present invention.

With reference to FIG. 11, each processor 1-i of the parallel processor system according to the present embodiment includes, in addition to the components shown in FIG. 6, a register 28 for preserving a fork destination address accompanying the fork request 7a transmitted from the execution unit 23 to the thread controller 3, a coincidence circuit 29 for determining whether the value of the PC21 is coincident with a fork destination address preserved in the register 28 and an AND gate 30 for outputting a logical product of outputs of the forked bit 27 and the coincidence circuit 29 to the execution unit 23.

When the output of the AND gate 30 attains a logical "1" as a result of coincidence of the value of the PC21 with a fork destination address preserved in the register 28 at a state where the forked bit 27 is set, the execution unit 23 ends processing of a thread and transmits the thread stop notice 7d to the thread controller 3. Even when the value of the PC21 coincides with the fork destination address preserved in the register 28, unless the forked bit 27 is set, the output of the AND gate 30 will not attain the logical "1", so that the execution unit 23 continues execution of an instruction according to the PC21.

Figure 12:
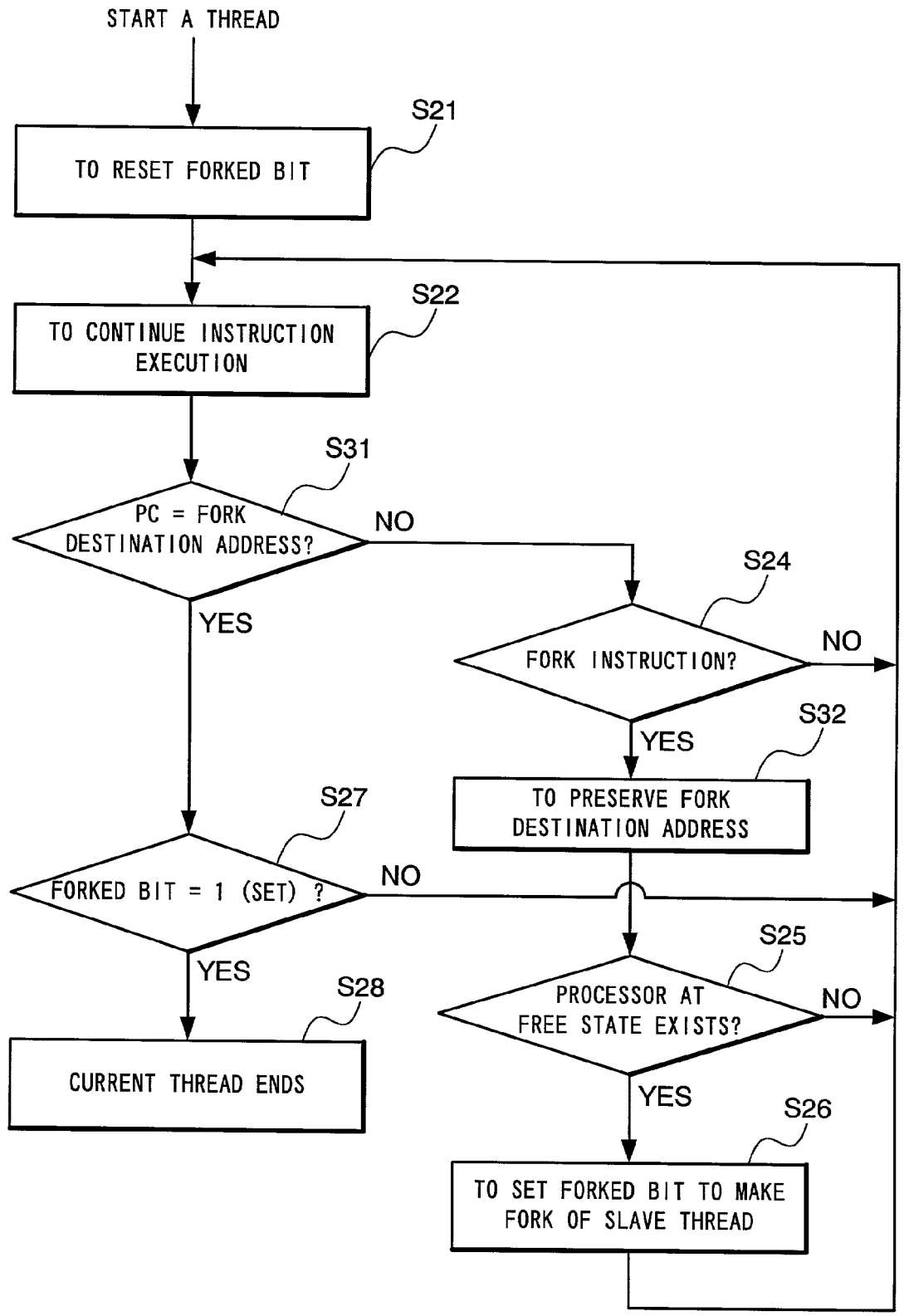
FIG. 12 is a flow chart showing another example of processing conducted by the processor and the thread controller from the start to the end of a thread in the parallel processor system of the present invention.

One example of the processing of the processor 1-i and the thread controller 3 from the start to the end of a thread according to the present embodiment is shown in FIG. 12. The difference from FIG. 7 resides in Steps S31 and S32.

In a case where an instruction decoded by the execution unit 23 is a fork instruction (YES at Step S24), the execution unit 23 preserves a fork destination address designated by the fork instruction in the register 28 (Step S32) and with the output of the register 28, the fork request 7a is transmitted to the thread controller 3. Similarly to the first embodiment, when there exists other processor 1-j at the free state which can start execution of a slave thread (YES at Step S25), the thread controller 3 sets the forked bit 27 of the processor 1-i, as well as sending the thread start request 7c to the other processor 1-j, thereby making fork of a slave thread (Step S26). On the other hand, when none of other processors that can start execution of a slave thread exists, the thread controller 3 abandons the fork request 7a transmitted from the processor 1-i to invalidate the fork instruction.

As the execution of an instruction proceeds in the processor 1-i and when the value of the PC21 coincides with the fork destination address preserved in the register 28 (YES at Step S31), if the forked bit 27 is set (YES at Step S27), the output of the AND gate 30 attains the logical "1" to generate an interruption to the execution unit 23, whereby the processor 1-i in question ends the processing of the thread (Step S28). However, if the forked bit 27 is not set, the instruction will be executed according to the PC21, that is, the group of slave thread instructions will be continuously executed (Step S22).

As described in the foregoing, since the multi-thread execution method according to the present embodiment eliminates the need of a term instruction in a parallelization program, the parallelization code inserting unit 45 in the compiler 41 shown in FIG. 9 inserts no term instruction immediately before a start point of a slave thread. FIG. 13 shows one example of the parallelization program 43 obtained by forming the sequential processing program 42 shown in FIG. 10(a) directed to the multi-thread execution method acceding to the present embodiment. The term instructions inserted immediately before the start points (-th1, -th2) of the slave thread in the parallelization program shown in FIG. 10(b) are omitted from the parallelization program of FIG. 13.

Third Embodiment

While in the first and second embodiments, forking is given up unless forking is possible at a fork point of a master thread, in the present embodiment, forking is conducted when there appears other processor which can start execution of a slave thread before a register file of a master thread is updated. In the following, the present embodiment will be described mainly with respect to the difference from the second embodiment.

Figure 14:
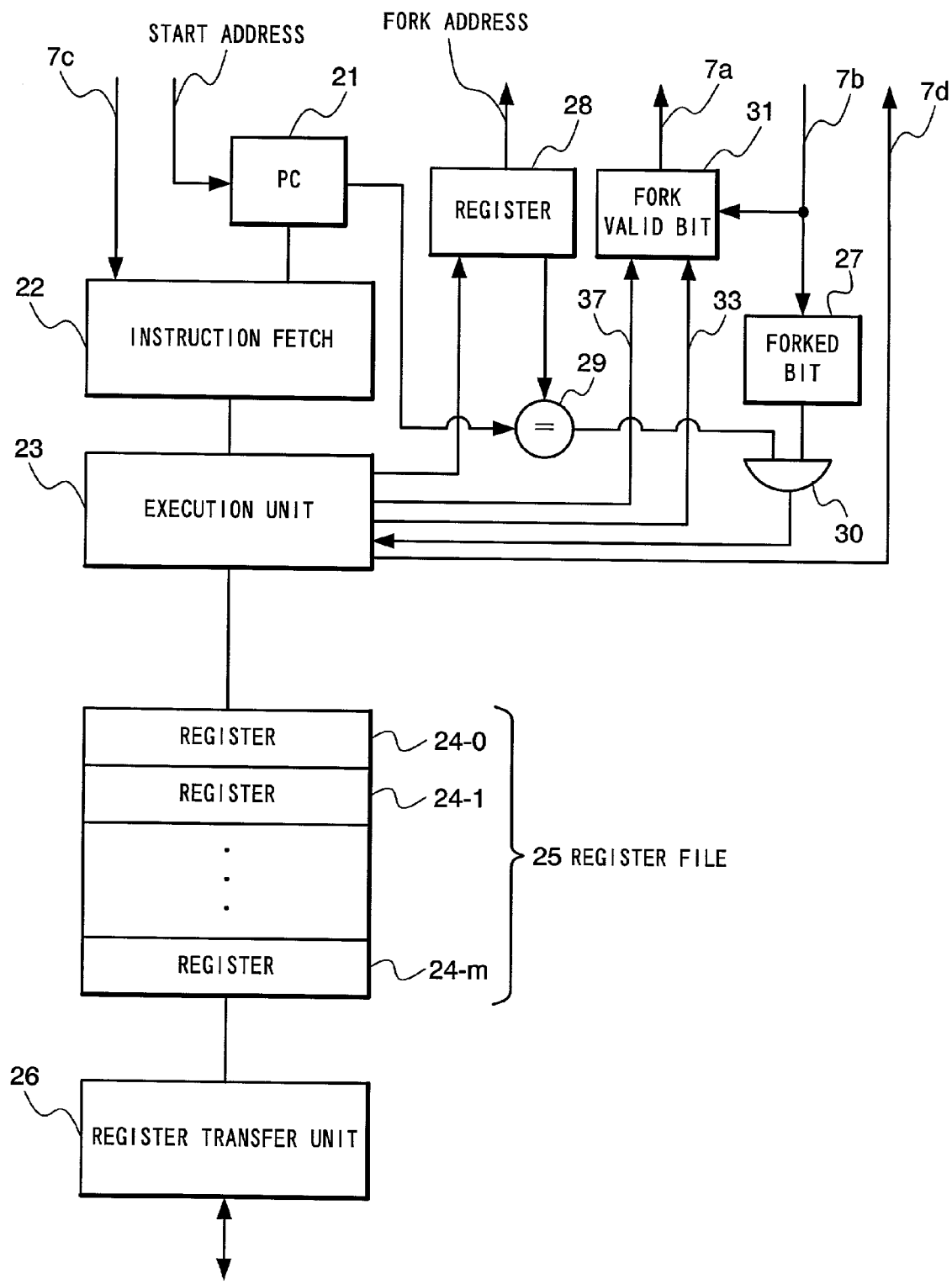
FIG. 14 is a block diagram showing a further example of a structure of a processor in a parallel processor system according to a third embodiment of the present invention.

With reference to FIG. 14, each processor 1-i of the parallel processor system according to the present embodiment includes, in addition to the components shown in FIG. 11, a fork valid bit 31. The fork valid bit 31 is set by a fork signal 37 output by the execution unit 23 when executing a fork instruction and reset by the fork response 7b received from the thread controller 3 and a register update signal 33 which the execution unit 23 outputs when updating any of the registers in the register file 25 of the master thread. The output of the fork valid bit 31 becomes the fork request 7a to the thread controller 3 and while the fork valid bit 31 is set, the fork request 7a will be continuously transmitted.

With reference to the above-described FIG. 4, although the thread control sequencer 11 of the thread controller 3, upon reception of the fork request 7a from the processor 1-i at certain clock timing, if none of processors exists that can start execution of a slave thread (NO at Step S1), abandons the fork request 7a in question, since the processor 1-i continues sending the fork request 7a while the fork valid bit 31 is set as described above, the thread controller 3 will again receive the fork request 7a from the processor 1-i at subsequent clock timing to repeat the processing of FIG. 4. In other words, when forking is impossible at a fork point, the fork instruction is held and executed at a time point where forking is enabled.

Figure 15:
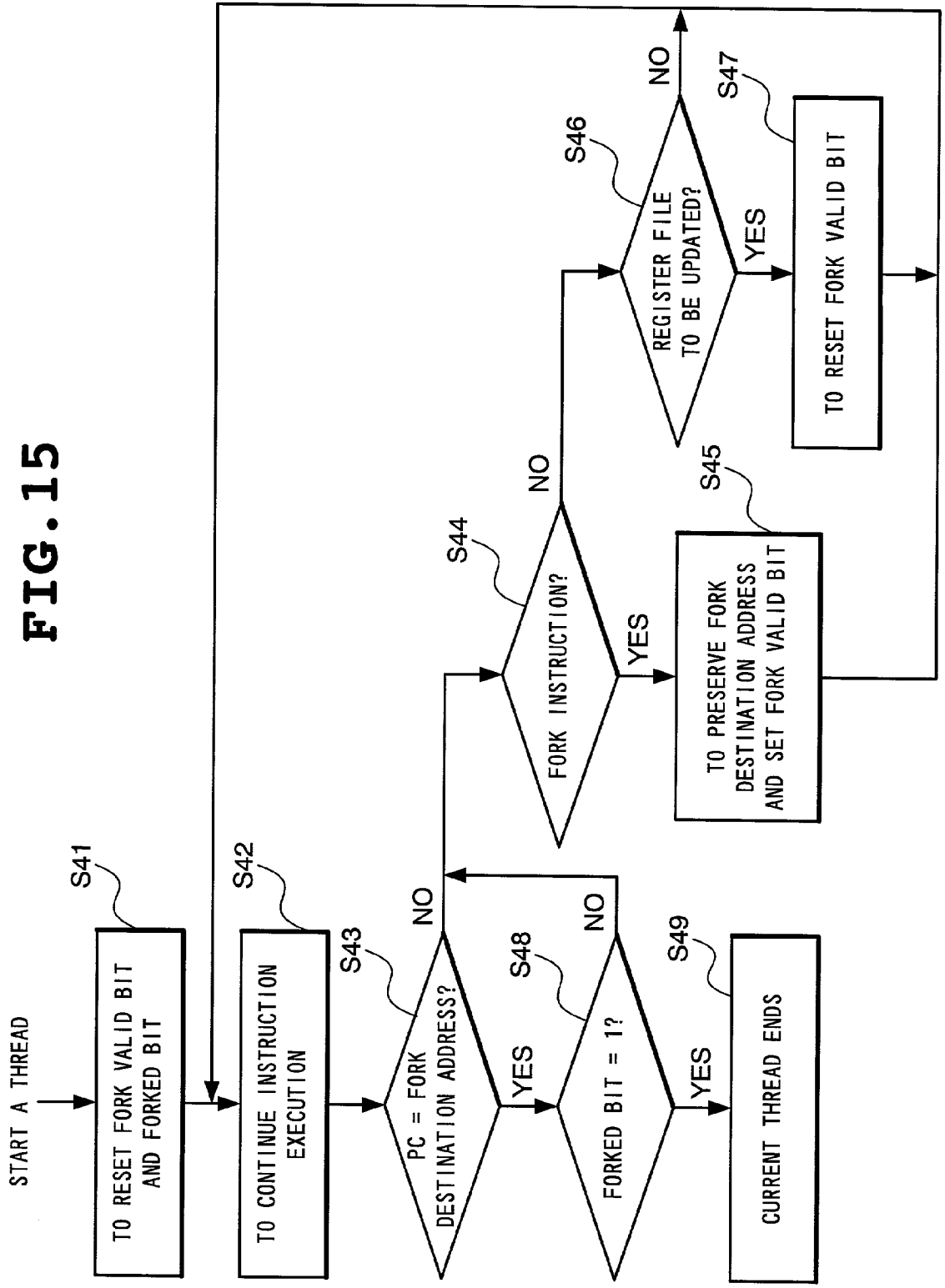
FIG. 15 is a flow chart showing a further example of processing conducted by the processor and the thread controller from the start to the end of a thread in the parallel processor system of the present invention.

Next, operation of the multi-thread execution method according to the present embodiment will be described with reference to the flow chart of FIG. 15 illustrating outlines of the processing by the processor 1-i and the thread controller 3 from the start to the end of the a thread.

At the start of execution of one thread by the processor 1-i based on the thread start request 7c from the thread controller 3, the fork valid bit 31 and the forked bit 27 of the processor 1-i in question are reset (Step S41) to continuously execute fetch, decoding and execution of an instruction of the thread thereafter (Step S42). FIG. 15 illustrates, in particular, outlines of the processing related to thread stop and the processing of a fork instruction.

In a case where the instruction decoded by the execution unit 23 is a fork instruction (YES at Step S44), the execution unit 23 preserves a fork destination address in the register 28, as well as outputting the fork signal 37 to set the fork valid bit 31 (Step S45). In addition, when updating any of the registers in the register file 25 (YES, at Step S46), the execution unit 23 outputs the register update signal 33 to reset the fork valid bit 31 (Step S47). Accordingly, from the processor 1-i, the fork request 7a will be continuously sent to the thread controller 3 during a period from the time of execution of the fork instruction to first update of the register file 25.

Upon receiving the fork request 7a from the processor 1-i at certain clock timing, the thread controller 3 checks whether there exists other processor 1-j at the free state which can start execution of a slave thread as illustrated in FIG. 4 (Step S1) and when other processor 1-j at the free state exists, updates the processor state table 12 in a manner as described above (Step S2) to transmit the fork response 7b to the processor 1-i, as well as sending the thread start request 7c to other processor 1-j to make fork of a slave thread (Step S3). The forked bit 27 is set and the fork valid bit 31 is reset by the fork response 7b output to the processor 1-i. On the other hand, when there exists none of other processors that can start execution of a slave thread (NO at Step S1), the thread controller 3 abandons the fork request 7a transmitted from the current processor 1-i to end the processing of FIG. 4, while the processor 1-i continues sending the fork request 7a as described above.

Figure 16:
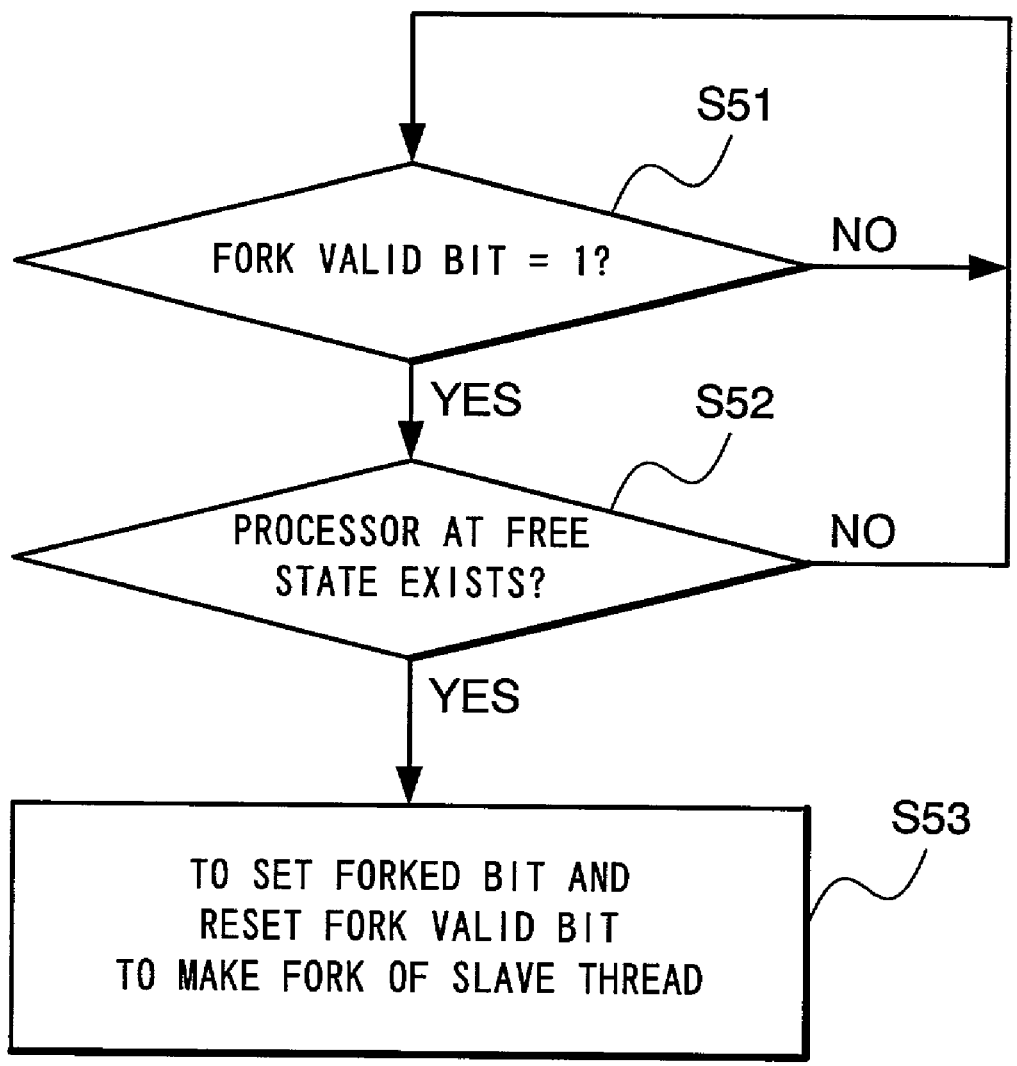
FIG. 16 is a flow chart showing another example of processing executed when the thread control sequencer of the thread controller receives the fork request from the processor.

Steps S51 to S53 of FIG. 16 are obtained by charting the foregoing processing as a flow from another aspect, in which when the fork valid bit 31 of the processor 1-i is set and the processor 1-j at the free state exists, forking of a slave thread is conducted to set the forked bit 27 of the processor 1-i as a fork requesting source and reset the fork valid bit 31. In the processor 1-i, during transfer of the register file 25 by the register transfer unit 26, write to the register file 25 from the execution unit 23 is kept waiting.

Similarly to the second embodiment, when execution of the instructions proceeds in the processor 1-i and the value of the PC21 coincides with the fork destination address preserved in the register 28 (YES at Step S43), if the forked bit 27 is set (YES at Step S48), the output of the AND gate 30 attains the logical "1" to interrupt the execution unit 23, so that the processor 1-i in question ends the processing of the thread (Step S49).

Figure 17:
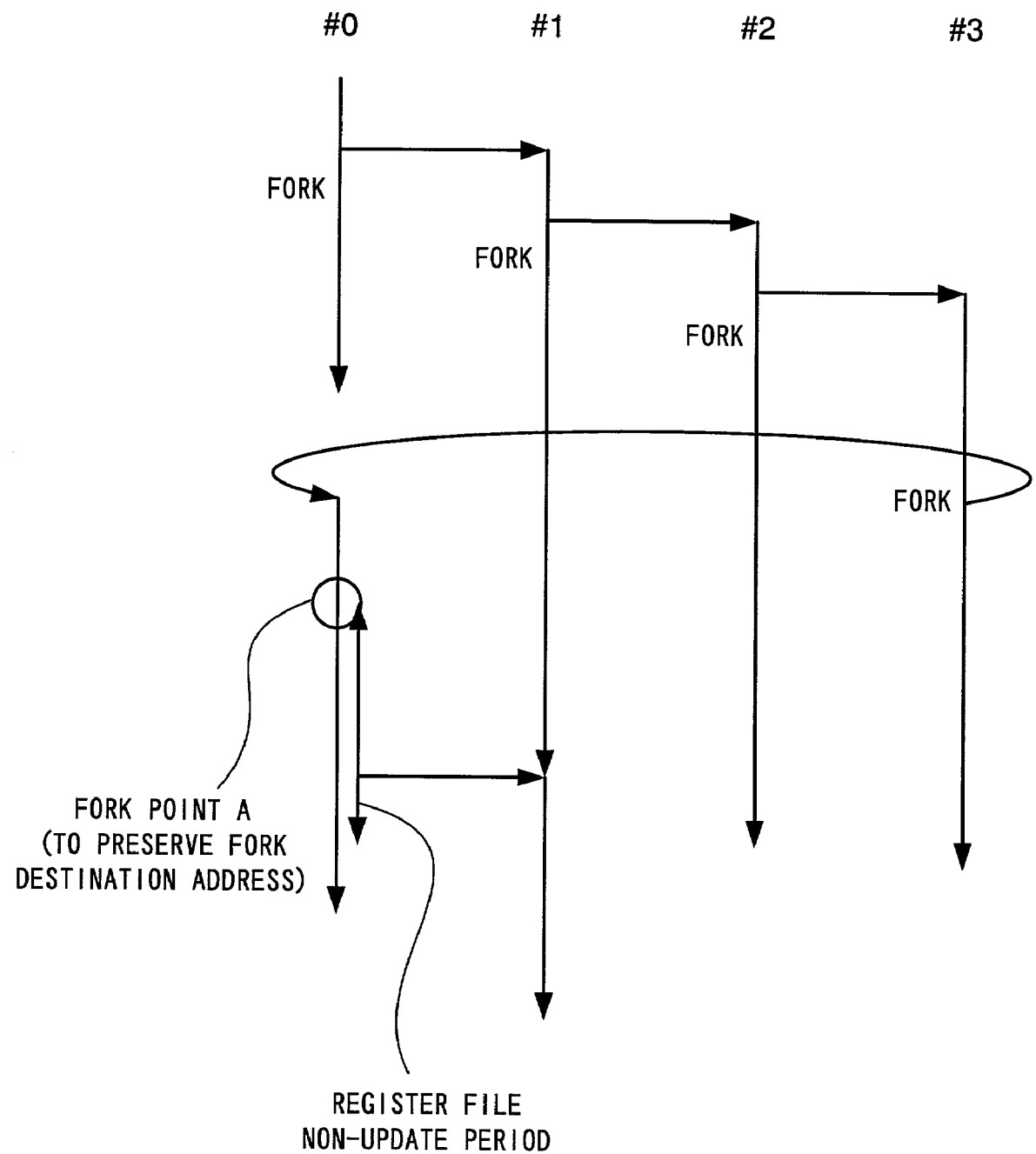
FIG. 17 is a diagram showing another example of an execution sequence of the multi-thread execution method of the present invention applied to a ring-type fork model.

One example of an execution sequence of the multi-thread execution method according to the present embodiment applied to a ring-type fork model is shown in FIG. 17. In the example premised on substantially the same conditions as those of FIG. 8, at a fork point A of a thread forked from the processor #3 to the processor #0, the adjacent processor #1 is at the busy state. In such conditions, while forking is immediately given up in the first and the second embodiments, the fork destination address is preserved in the register 28 at the fork point A to hold forking in the present embodiment. The arrow extending downward from the fork point A indicates a period where the register file 25 is not updated at all in the processor #0. In FIG. 17, because the processor #1 enters the free state during this period, the held forking is executed to generate a slave thread in the processor #1. On the other hand, because the processor #0 generates a slave thread, it ends the processing of the thread when reaching the fork destination address.

Constituting the sequence such that the execution unit 23 of each processor 1-i shown in FIG. 14 determines whether the output of the AND gate 30 is at the logical "1" at the time of decoding of a term instruction and when the output is at the logical "1", ends the processing of the thread by executing the term instruction and otherwise invalidates the term instruction in question to continue execution of the processing of a subsequent instruction according to the PC21 obtains another embodiment which smoothly embodies a parallelization program in which a term instruction is inserted immediately before a start point of a slave thread as in the first embodiment.

Fourth Embodiment

While in the third embodiment, when forking is not possible at a fork point of a master thread, forking is once held and if none of other processors appears that can start execution of a slave thread before a register file of the master thread is updated, the forking in question is given up, in the present embodiment, even if the register file of the master thread is updated, forking is conducted unless the update is made of a register to be handed over to a slave thread. In the following, the present embodiment will be described mainly with respect to a difference from the third embodiment.

Figure 18:
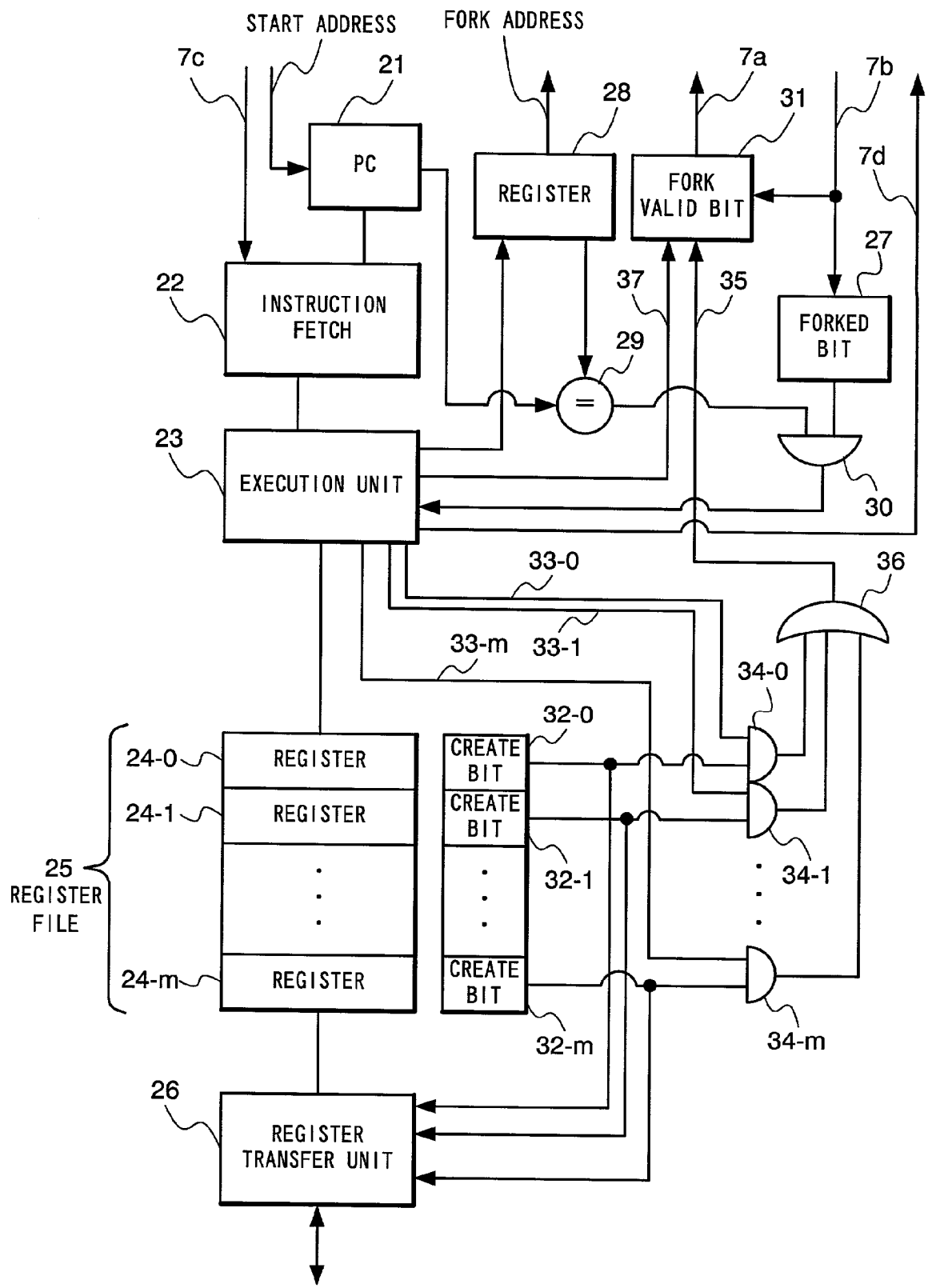
FIG. 18 is a block diagram showing an example of a structure of a processor in a parallel processor system according to a fourth embodiment of the present invention.

With reference to FIG. 18, each processor 1-i of the parallel processor system according to the present embodiment includes, in addition to the components shown in FIG. 14, a create bit 32-k which one-to-one corresponds to each register 24-k (k=0~m) of the register file 25 and is set only when its corresponding register 24-k is a register to be handed over to a slave thread, an AND gate 34-k which one-to-one corresponds to each register 24-k and receives input of an output of the create bit 32-k of the corresponding register 24-k and the register update signal 33-k output by the execution unit 23 when updating the register 24-k, and an OR gate 36 for outputting a fork invalid signal 35 which is a logical sum signal of an output of the AND gate 34-k. Then, in place of the register update signal 33 of FIG. 14, the fork invalid signal 35 is output as a reset signal to the fork valid bit 31. In addition, the system is structured such that the value of each create bit 32-k is output to the register transfer unit 26 and the register transfer unit 26 transfers, to a register file of a fork destination processor, only a register whose corresponding create bit 32-k is set among registers 24-k of the register file 25.

Figure 19:
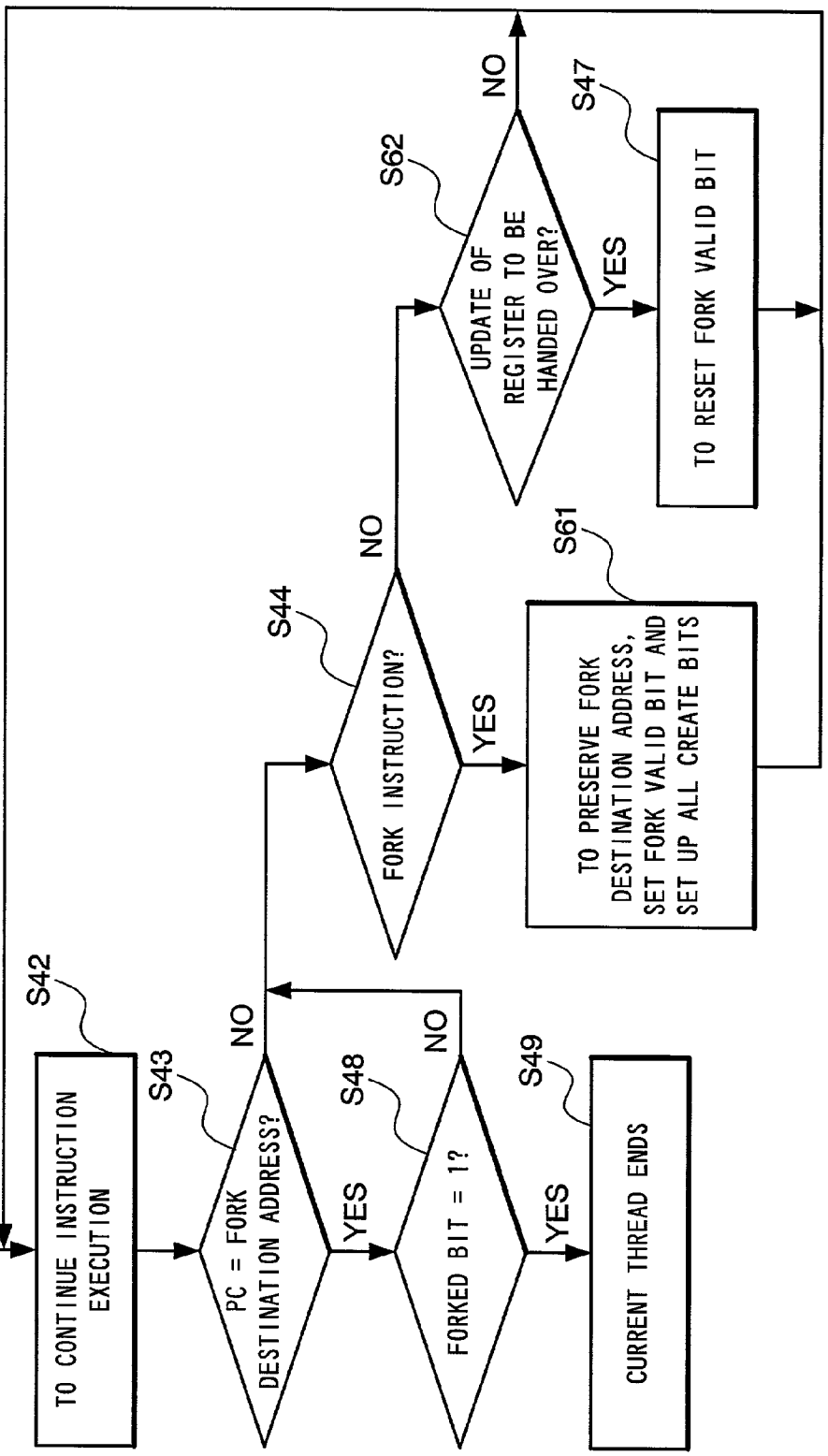
FIG. 19 is a flow chart showing a further example of processing conducted by the processor and the thread controller from the start to the end of a thread in the parallel processor system of the present invention.

Outlines of the processing conducted by the processor 1-*i* and the thread controller 3 from the start to the end of a thread in the present embodiment are shown in FIG. 19. The difference from FIG. 15 resides in Steps S61 and 62.

When the instruction decoded by the execution unit 23 is a fork instruction (YES at Step S44), the execution unit 23 preserves a fork destination address in the register 28, as well as outputting the fork signal 37 to set the fork valid bit 31 and set up all the create bits 32-*k* (Step S61). More specifically, among the registers 24-*k* of the register file 25, the unit 23 sets the create bit 32-*k* corresponding to a register to be handed over to the slave thread and keeps the create bit 32-*k* corresponding to a register which needs not to be handed over reset. In addition, when updating any of the registers 24-*k* in the register file 25, the execution unit 23 brings the register update signal 33-*k* corresponding to the updated register 24-*k* to the logical "1". As a result, if the updated register 24-*k* is a register to be handed over to a slave thread, because the create bit 32-*k* corresponding to the register 24-*k* is set, the output of the AND gate 34-*k* corresponding to the register 24-*k* attains the logical "1", so that the fork invalid signal 35 is output from the OR gate 36 to reset the fork valid bit 31 (Steps S62 and S47). In other words, from the processor 1-*i*, the fork request 7*a* will be continuously sent to the thread controller 3 during a period from the time of fork instruction execution to a time when any of registers to be handed over to the slave thread in the register file 25 is first updated.

Figure 20:
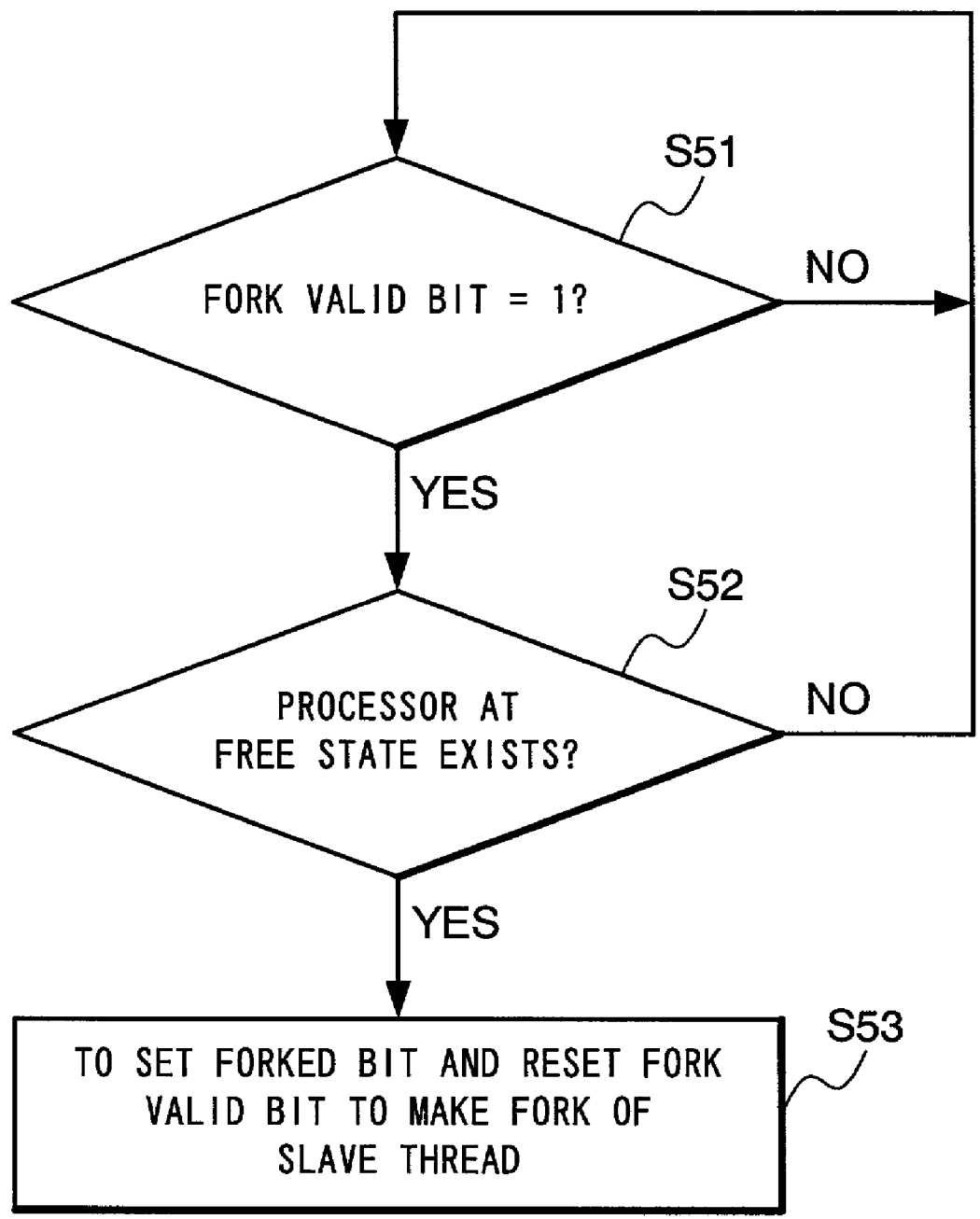
FIG. 20 is a flow chart showing other example of processing executed when the thread control sequencer of the thread controller receives the fork request from the processor.

The thread controller 3 conducts the same processing as that of the third embodiment. As a result, among the registers 24-*k* of the register file 24 in the processor 1-*i*, when other processor appears which can start execution of a slave thread before a register to be handed over to the slave thread is updated, the controller transmits the fork response 7*b* to the processor 1-*i*, as well as sending the thread start request 7*c* to other processor 1-*j*, thereby conducting fork of a slave thread (Steps S51 to S53 in FIG. 20). The register transfer unit 26 of the processor 1-*i* having received the fork response 7*b* transfers, to a register file of a fork destination processor, only a register whose corresponding create bit 32-*k* is set among the registers 24-*k* of the register file 25.

When execution of an instruction proceeds in the processor 1-*i* and the value of the PC21 coincides with a fork destination address preserved in the register 28 (YES at Step S43) similarly to the third embodiment, if the forked bit 27 is set (YES at Step S48), the output of the AND gate 30 attains the logical "1" to generate an interruption to the execution unit 23, whereby the processor 1-*i* in question ends the processing of the thread (Step S49).

An example of an execution sequence of the multi-thread execution method according to the present embodiment applied to the ring-type fork model will be similar to that shown in FIG. 17. In the present embodiment, however, the arrow extending downward from the fork point A indicates a period where a register to be handed over to a slave thread in the register file 25 is not updated at all in the processor #0 and by the length of the period, a fork enable period is extended.

In the present embodiment, a register to be handed over to a slave thread at a fork point of a master thread should be determined. Therefore, the control and data flow analysis unit 44 in the compiler 41 in FIG. 9 examines, for each slave thread whose fork is to be made, a register to be handed over from a master thread to a slave thread and the parallelization code inserting unit 45 inserts a description which designates a register to be handed over to the slave thread into the parallelization program 43 based on the examination result.

FIG. 21 shows one example of the parallelization program 43 obtained by forming the sequential processing program 42 of FIG. 10(*a*) directed to the multi-thread execution method according to the present embodiment. ⌈r1, r16, sp⌋ in the first line and ⌈r1, sp⌋ in the fifth line of the fork instruction are descriptions designating registers to be handed over to a slave thread. The execution unit 23 of each program 1-*i* interprets such designation of a register to be handed over at the time of decoding of a fork instruction and sets only the create bit 32-*k* corresponding to the designated register 24-*k*.

FIG. 22 shows another example of the parallelization program 43 obtained by forming the sequential processing program 42 of FIG. 10(*a*) directed to the multi-thread execution method according to the present embodiment. While by the method in which a register to be handed over is designated by a fork instruction as shown in FIG. 21, an instruction width of a fork instruction is large, in the present embodiment, a special instruction called a create instruction is defined and a register to be handed over to a slave thread is designated by the create instruction, whereby an increase in an instruction width of a fork instruction can be suppressed. On the other hand, because of addition of a special instruction called a create instruction, the number of instructions is increased. Therefore, it is assumed that when no create instruction exists, all the registers are to be handed over (or a predetermined group of registers set in advance in the system are to be handed over) and when a create instruction exists, only a register designated by the instruction is to be handed over. Accordingly, since the fork instruction in the first line of FIG. 22 has none of immediately preceding create instructions, all the registers are recognized to be handed over, and since the fork instruction in the sixth line has a create instruction immediately therebefore which designates the register r1, sp, only the register r1, sp is a target of handover.

FIG. 23 shows a further example of the parallelization program 43 obtained by forming the sequential processing program 42 of FIG. 10(*a*) directed to the multi-thread execution method according to the present embodiment. While in FIG. 22, a create instruction is inserted immediately before a fork instruction, in the present embodiment a create instruction is inserted immediately after a fork instruction. While inserting a create instruction immediately before a fork instruction results in an increase in the number of instructions to be executed in sequential operation by one, inserting a create instruction immediately after a fork instruction enables a fork instruction to be executed as quickly as possible, thereby increasing a part operable in parallel to each other.

Although the register transfer unit 26 in the present embodiment is structured to refer to the create bit 32-*k* to transfer, to a register file of a fork destination processor, only a register to be handed over to a slave thread in the register file 25 of a master thread, it is as another embodiment possible to start a sequence of transferring a register in a predetermined order starting with a top register of the register file 25 and at a time point where transfer of all the registers in which the create bit 32-*k* is set is completed, stop the transfer sequence. While this method has a disadvantage that a register which needs not to be handed over to a slave thread might be transferred, it has an advantage that a transfer sequence is simplified. The register transfer unit 26 may be as a matter of course structured as another embodiment to transfer all the registers all the time without referring to the create bit 32-*k*. Moreover, noticing the fact that even a register to be handed over to a slave thread needs not to be daringly transferred when the register in question of the fork destination processor attains the same value as that of the master thread at the time of forking, the embodiment may be structured such that among registers to be handed over to the slave thread, only a register having a value different from that of the master thread is detected and transferred from the register transfer unit 26 to the fork destination processor.

Structuring the execution unit 23 of each processor 1-*i* shown in FIG. 18 to determine whether an output of the AND gate 30 has the logical "1" at the time of decoding of a term instruction, when the output has the logical "1", executes the term instruction in question to end the processing of the thread and when it fails to have the logical "1", invalidates the term instruction in question to continue processing of a subsequent instruction according to the PC21 obtains another embodiment which smoothly embodies a parallelization program in which a term instruction is inserted immediately before a start point of a slave thread as in the first embodiment.

Although the present invention has been described in the foregoing with respect to several embodiments, the present invention is not limited to the foregoing embodiments and other kinds of various addition and modification are possible. For example, although in the above-described embodiments, the present invention is applied to a concentrated thread control type parallel processor system in which the thread controller 3 is shared by a plurality of processors, the present invention is also applicable to a distributed thread control type parallel processor system in which a thread controller is provided for each processor as recited in the Literature 1. In addition, although the processors are connected to each other by the communication bus 6, the present invention, in a ring-type fork model, is also applicable to a parallel processor system in which processors adjacent to each other are connected on a ring by a communication line.

As described in the foregoing, the present invention has an effect of enabling processing of a program to be executed smoothly without interruption of the processing even when none of free processors exists that can generate a slave thread at a time point of a fork instruction of a master thread, while suppressing an increase in the amount of hardware caused by the provision of numbers of register files and an increase in the amount of overhead caused at process switching by an OS.

Furthermore, since even if forking is impossible at a time point of a fork instruction, when other processor appears which can start execution of a slave thread before a register file is updated, forking is enabled, forkability is increased more than that in the first invention to improve parallelism of thread execution.

Moreover, since according to the present invention, even if a register file of a master thread is updated, forking is conducted unless the update is made of a register to be handed over to a slave thread, a forkability can be increased more than that in the second embodiment to further improve parallelism of thread execution.

The present invention also enables smooth execution of a program in which a term instruction is placed immediately before a start point of a slave thread as in conventional art.

Furthermore, the present invention eliminates the need of placing a term instruction immediately before a start point of a slave thread to enable a program to be down-sized by the reduction of term instructions and enable improvement of processing performance by the reduction in a capacity necessary for instruction memory and reduction in the number of instruction fetches.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A multi-thread execution method of dividing a single program into a plurality of threads to execute the threads in parallel to each other by a plurality of processors, comprising the steps of:
   determining a forkability of a slave thread into other processor in response to a fork instruction in a master thread, and
   when forkable, making fork of said slave thread, and when not forkable, successively executing, by a processor executing said master thread, an instruction in said master thread subsequent to said fork instruction and then executing a group of instructions of said slave thread.

2. The multi-thread execution method as set forth in claim 1, wherein
   determination of said forkability is conducted only at a time point of said fork instruction.

3. The multi-thread execution method as set forth in claim 2, wherein
   determination of said forkability is made based on whether there exists an other processor which can start execution of said slave thread at a time point of said fork instruction.

4. The multi-thread execution method as set forth in claim 1, wherein
   determination of said forkability is conducted at a time point of said fork instruction and when determining that the slave thread is not forkable, conducted at a time point after said fork instruction.

5. The multi-thread execution method as set forth in claim 4, wherein
   determination of said forkability at a time point of said fork instruction is made based on whether there exists an other processor which can start execution of said slave thread, and
   determination of said forkability at a time point after said fork instruction is made based on whether there appears an other processor which can start execution of said slave thread before a register file of said master thread is updated.

6. The multi-thread execution method as set forth in claim 4, wherein
   determination of said forkability at a time point of said fork instruction is made based on whether there exists an other processor which can start execution of said slave thread, and
   determination of said forkability at a time point after said fork instruction is made based on whether there appears an other processor which can start execution of said slave thread before a register to be handed over to said slave thread among registers in a register file of said master thread is updated.

7. The multi-thread execution method as set forth in claim 1, wherein when forking of said slave thread is conducted, a forked bit provided in said processor executing said master thread is set to validate a term instruction of a thread being executed by said processor in which said forked bit is set and invalidate a term instruction of a thread being executed by said processor in which said forked bit is not set.

8. The multi-thread execution method as set forth in claim 1, wherein
at a time point of a fork instruction of said master thread, a fork destination address is preserved in a register provided in said processor executing said master thread and when forking of said slave thread is conducted, a forked bit provided in said processor executing said master thread is set, whereby said processor in which said forked bit is set and whose program counter value coincides with said fork destination address preserved in said register ends processing of a thread.

9. A multi-thread execution method in a parallel processor system which has a plurality of processors each individually having a program counter and a register file to simultaneously fetch, interpret and execute an instruction of a thread according to said program counter and has a function of causing other of said processors to start execution of a slave thread starting at a fork destination address designated by a fork instruction in a master thread being executed by any of said processors, with a value of at least a register necessary for said slave thread in a register file of said master thread at a time point of said fork instruction handed over to said slave thread, comprising the steps of:
  (a) at a time point of a fork instruction in the master thread, determining a forkability of a slave thread into other processor in response to said fork instruction based on whether there exists an other processor which can start execution of said slave thread,
  (b) when forkable, making fork of said slave thread to set a forked bit provided in said processor executing said master thread and when not forkable, invalidating said fork instruction to successively execute an instruction in said master thread subsequent to said fork instruction by the processor executing said master thread, and
  (c) validating a term instruction of a thread being executed by said processor in which said forked bit is set and invalidating a term instruction of a thread being executed by said processor in which said forked bit is not set.

10. A multi-thread execution method in a parallel processor system which has a plurality of processors each individually having a program counter and a register file to simultaneously fetch, interpret and execute an instruction of a thread according to said program counter and has a function of causing other of said processors to start execution of a slave thread starting at a fork destination address designated by a fork instruction in a master thread being executed by any of said processors, with a value of at least a register necessary for said slave thread in a register file of said master thread at a time point of said fork instruction handed over to said slave thread, comprising the steps of:
  (a) at a time point of a fork instruction in the master thread, preserving a fork destination address in a register provided in said processor executing said master thread, as well as determining a forkability of a slave thread into other processor in response to said fork instruction based on whether there exists an other processor which can start execution of said slave thread,
  (b) when forkable, making fork of said slave thread to set a forked bit provided in said processor executing said master thread and when not forkable, invalidating said fork instruction to successively execute an instruction in said master thread subsequent to said fork instruction by the processor executing said master thread, and
  (c) ending processing of a thread by said processor in which said forked bit is set and whose program counter value coincides with said fork destination address preserved in said register.

11. A multi-thread execution method in a parallel processor system which has a plurality of processors each individually having a program counter and a register file to simultaneously fetch, interpret and execute an instruction of a thread according to said program counter and has a function of causing other of said processors to start execution of a slave thread starting at a fork destination address designated by a fork instruction in a master thread being executed by any of said processors, with a value of at least a register necessary for said slave thread in a register file of said master thread at a time point of said fork instruction handed over to said slave thread, comprising the steps of:
  (a) at a time point of a fork instruction in the master thread, preserving a fork destination address in a register provided in said processor executing said master thread, as well as determining a forkability of a slave thread into other processor in response to said fork instruction based on whether there exists an other processor which can start execution of said slave thread,
  (b) when the determination at Step (a) is made that the slave thread is forkable, making fork of said slave thread to set a forked bit provided in said processor executing said master thread and when not forkable, holding forking by said fork instruction to successively execute an instruction in said master thread subsequent to said fork instruction by the processor executing said master thread,
  (c) when holding forking at Step (b), in parallel to the execution of an instruction subsequent to said fork instruction, determining a forkability of a slave thread into other processor in response to said fork instruction based on whether there appears an other processor which can start execution of said slave thread before the register file of said master thread is updated and at a time point where the determination is made that the slave thread is forkable, making fork of the slave thread according to the fork destination address preserved in said register to set a forked bit provided in said processor executing said master thread, and
  (d) validating a term instruction of a thread being executed by said processor in which said forked bit is set and invalidating a term instruction of a thread being executed by said processor in which said forked bit is not set.

12. A multi-thread execution method in a parallel processor system which has a plurality of processors each individually having a program counter and a register file to simultaneously fetch, interpret and execute an instruction of a thread according to said program counter and has a function of causing other of said processors to start execution of a slave thread starting at a fork destination address designated by a fork instruction in a master thread being executed by any of said processors, with a value of at least a register necessary for said slave thread in a register file of said master thread at a time point of said fork instruction handed over to said slave thread, comprising the steps of:

(a) at a time point of a fork instruction in the master thread, preserving a fork destination address in a register provided in said processor executing said master thread, as well as determining a forkability of a slave thread into other processor in response to said fork instruction based on whether there exists an other processor which can start execution of said slave thread, (b) when the determination at Step (a) is made that the slave thread is forkable, making fork of said slave thread to set a forked bit provided in said processor executing said master thread and when not forkable, holding forking by said fork instruction to successively execute an instruction in said master thread subsequent to said fork instruction by the processor executing said master thread, (c) when the determination is made at Step (a) that the slave thread is not forkable, in parallel to the execution of an instruction subsequent to said fork instruction, determining a forkability of a slave thread into other processor in response to said fork instruction based on whether there appears an other processor which can start execution of said slave thread before the register file of said master thread is updated and at a time point where forkability is attained, making fork of the slave thread according to the fork destination address preserved in said register to set a forked bit provided in said processor executing said master thread, and (d) ending processing of a thread by said processor in which said forked bit is set and whose program counter value coincides with said fork destination address preserved in said register.

13. A multi-thread execution method in a parallel processor system which has a plurality of processors each individually having a program counter and a register file to simultaneously fetch, interpret and execute an instruction of a thread according to said program counter and has a function of causing other of said processors to start execution of a slave thread starting at a fork destination address designated by a fork instruction in a master thread being executed by any of said processors, with a value of at least a register necessary for said slave thread in a register file of said master thread at a time point of said fork instruction handed over to said slave thread, comprising the steps of:

(a) at a time point of a fork instruction in the master thread, preserving a fork destination address in a register provided in said processor executing said master thread, as well as determining a forkability of a slave thread into other processor in response to said fork instruction based on whether there exists an other processor which can start execution of said slave thread, (b) when the determination at Step (a) is made that the slave thread is forkable, making fork of said slave thread to set a forked bit provided in said processor executing said master thread and when not forkable, holding forking by said fork instruction to successively execute an instruction in said master thread subsequent to said fork instruction by the processor executing said master thread, (c) when the determination is made at Step (a) that the slave thread is not forkable, in parallel to the execution of an instruction subsequent to said fork instruction, determining a forkability of a slave thread into other processor in response to said fork instruction based on whether there appears an other processor which can start execution of said slave thread before a register to be handed over to said slave thread among registers in the register file of said master thread is updated and at a time point where the determination is made that the slave thread is forkable, making fork of the slave thread according to the fork destination address preserved in said register to set a forked bit provided in said processor executing said master thread, and (d) validating a term instruction of a thread being executed by said processor in which said forked bit is set and invalidating a term instruction of a thread being executed by said processor in which said forked bit is not set.

14. A multi-thread execution method in a parallel processor system which has a plurality of processors each individually having a program counter and a register file to simultaneously fetch, interpret and execute an instruction of a thread according to said program counter and has a function of causing other of said processors to start execution of a slave thread starting at a fork destination address designated by a fork instruction in a master thread being executed by any of said processors, with a value of at least a register necessary for said slave thread in a register file of said master thread at a time point of said fork instruction handed over to said slave thread, comprising the steps of:

(a) at a time point of a fork instruction in the master thread, preserving a fork destination address in a register provided in said processor executing said master thread, as well as determining a forkability of a slave thread into other processor in response to said fork instruction based on whether there exists an other processor which can start execution of said slave thread, (b) when the determination at Step (a) is made that the slave thread is forkable, making fork of said slave thread to set a forked bit provided in said processor executing said master thread and when not forkable, holding forking by said fork instruction to successively execute an instruction in said master thread subsequent to said fork instruction by the processor executing said master thread, (c) when the determination is made at Step (a) that the slave thread is not forkable, in parallel to the execution of an instruction subsequent to said fork instruction, determining a forkability of a slave thread into other processor in response to said fork instruction based on whether there appears an other processor which can start execution of said slave thread before a register to be handed over to said slave thread among registers in the register file of said master thread is updated and at a time point where the determination is made that the slave thread is forkable, making fork of the slave thread according to the fork destination address preserved in said register to set a forked bit provided in said processor executing said master thread, and (d) ending processing of a thread by said processor in which said forked bit is set and whose program counter value coincides with said fork destination address preserved in said register.

15. A parallel processor system for executing a single program divided into a plurality of threads in parallel to each other by a plurality of processors, comprising:

means for determining a forkability of a slave thread into other processor in response to a fork instruction in a master thread, and means for making fork of said slave thread when forkable and, successively executing, by a processor executing said master thread, an instruction in said master thread subsequent to said fork instruction and then executing a group of instructions of said slave thread when not forkable.

16. The parallel processor system as set forth in claim 15, wherein
said forkability determination means conducts determination of said forkability only at a time point of said fork instruction.

17. The parallel processor system as set forth in claim 16, wherein
said forkability determination means conducts determination of said forkability based on whether there exists an other processor which can start execution of said slave thread at a time point of said fork instruction.

18. The parallel processor system as set forth in claim 15, wherein
said forkability determination means
conducts determination of said forkability at a time point of said fork instruction and when determining that the slave thread is not forkable, conducts determination also at a time point after said fork instruction.

19. The parallel processor system as set forth in claim 18, wherein
said forkability determination means
conducts determination of said forkability at a time point of said fork instruction based on whether there exists an other processor which can start execution of said slave thread, and
conducts determination of said forkability at a time point after said fork instruction based on whether there appears an other processor which can start execution of said slave thread before a register file of said master thread is updated.

20. The parallel processor system as set forth in claim 18, wherein
said forkability determination means
conducts determination of said forkability at a time point of said fork instruction based on whether there exists an other processor which can start execution of said slave thread, and
conducts determination of said forkability at a time point after said fork instruction based on whether there appears an other processor which can start execution of said slave thread before a register to be handed over to said slave thread among registers in a register file of said master thread is updated.

21. The parallel processor system as set forth in claim 15, further comprising:
means for setting a forked bit provided in said processor executing said master thread when forking of said slave thread is conducted, and
means for validating a term instruction of a thread being executed by said processor in which said forked bit is set and invalidating a term instruction of a thread being executed by said processor in which said forked bit is not set.

22. The parallel processor system as set forth in claim 15, further comprising:
means for preserving, at a time point of a fork instruction of said master thread, a fork destination address in a register provided in said processor executing said master thread,
means for setting a forked bit provided in said processor executing said master thread when forking of said slave thread is conducted, wherein
said processor in which said forked bit is set and whose program counter value coincides with said fork destination address preserved in said register ends processing of a thread.

23. A multi-thread execution method dividing a single program into a plurality of threads to execute the threads in parallel to each other by a plurality of processors, wherein one processor of said plurality of processors executes a first master thread and generates a first slave thread to an other processor of the plurality of processors, comprising the steps of:
executing by said other processor the generated first slave thread as a second master thread and generating a second slave thread to another processor of the plurality of processors sequentially;
determining a forkability of said second slave thread into said another processor; and
when forkable, making fork of said second slave thread and when not forkable, successively executing, by said other processor executing said second master thread, an instruction of said second master thread, and then successively executing a group of instructions of said second slave thread.

* * * * *